(12) United States Patent
Hwang

(10) Patent No.: US 10,582,334 B2
(45) Date of Patent: Mar. 3, 2020

(54) PLAY ACTIVITY TRACKING SYSTEM AND METHOD

(71) Applicant: I-NORILAB. CO., LTD., Seoul (KR)

(72) Inventor: Kwang Man Hwang, Seoul (KR)

(73) Assignee: I-NORILAB. CO., LTD., Seoul (KR)

( * ) Notice: Subject to any disclaimer, the term of this patent is extended or adjusted under 35 U.S.C. 154(b) by 0 days.

(21) Appl. No.: 16/199,879

(22) Filed: Nov. 26, 2018

(65) Prior Publication Data

US 2019/0166455 A1 May 30, 2019

(30) Foreign Application Priority Data

Nov. 30, 2017 (KR) .................. 10-2017-0163589

(51) Int. Cl.
*G06F 7/00* (2006.01)
*G06F 17/00* (2019.01)
*H04W 4/021* (2018.01)
*H04W 4/029* (2018.01)
*G06K 19/077* (2006.01)
*A63H 33/00* (2006.01)
*A63G 31/00* (2006.01)

(52) U.S. Cl.
CPC ............ *H04W 4/021* (2013.01); *A63G 31/00* (2013.01); *A63H 33/008* (2013.01); *G06K 19/07762* (2013.01); *H04W 4/029* (2018.02)

(58) Field of Classification Search
USPC ................................. 235/375, 376, 451, 492
See application file for complete search history.

(56) References Cited

U.S. PATENT DOCUMENTS

| 2006/0058948 | A1* | 3/2006 | Blass ................. | G01C 21/343 701/408 |
| 2010/0090838 | A1* | 4/2010 | Robinson ............ | G08B 27/001 340/573.4 |
| 2015/0156567 | A1* | 6/2015 | Oliver .................. | H04W 4/80 340/870.07 |
| 2015/0350848 | A1* | 12/2015 | Eramian ............... | H04W 4/90 455/404.2 |
| 2015/0371167 | A1* | 12/2015 | Hall .................... | G06Q 10/06313 705/36 R |

(Continued)

FOREIGN PATENT DOCUMENTS

KR    10-2013-0000204 A    1/2013

*Primary Examiner* — Tuyen K Vo
(74) *Attorney, Agent, or Firm* — Novick, Kim & Lee, PLLC; Jae Youn Kim

(57) ABSTRACT

Provided are a play activity tracking system and a play activity tracking method. When a child walks around each of a plurality of sensory play spaces and performs a play activity excitingly while wearing a beacon device, individual play patterns are monitored and collected through beacon devices, and the collected data is analyzed in real time according to various indicators to print out a comprehensive play result on a report result sheet. The play activity tracking system includes: at least one beacon device worn on a body of a user who walks around a plurality of play spaces and performs a play activity; a user registration device for registering the user; at least one beacon scanner disposed at each of the play spaces; a data collection and analysis device for collecting data of the beacon scanner; and a play report device communicating with the data collection and analysis device.

13 Claims, 33 Drawing Sheets

(56) References Cited

U.S. PATENT DOCUMENTS

| | | | | |
|---|---|---|---|---|
| 2016/0043924 A1* | 2/2016 | Cejnar | ................ | G06F 11/3006 |
| | | | | 709/224 |
| 2017/0337528 A1* | 11/2017 | Hall | ....................... | G06Q 20/10 |
| 2019/0080157 A1* | 3/2019 | Lev | .................... | G06K 9/00342 |

* cited by examiner

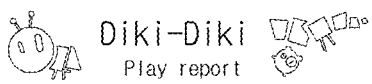

Diki-Diki Play report

Access code: R170900273

Diki-Diki Sensory Playground is planned and designed based on a play activity frame on the basis of a Nuri curriculum, a career maturity test theory, a design sense experience, etc. along with child development/education experts. A play location and a stay time of your child are tracked by IoT devices to observe what play activities are played by the child at the playground and provide an observation result.

NO! Do not judge your children with the observation result. This is a result of play experiences, not developmental abilities of children.

YES! Encourage and praise your child talking about the activities while played the most number of times today. Playing with peers can help your child develop social skills.

Name: Hwang Jun-hyung  Play date: 2017.09.04. Sunday  Age/Gender: Age 8/Male  Number of visits: 2 times What activities did my child play the most today?
First/Extra-large imagination forest puzzle  Second/Bird egg nest  Third/Forest rest area

| Playground name | Sensory play activity | Design sensory play | Play type | Play activity property | Play time |
|---|---|---|---|---|---|
| ZONE1 Spring | Atelier | ★ | | Increases curiosity about artistic elements through activities of exploring colors, shapes, patterns, materials, etc. and enhances creative expression ability | 4 minutes |
| ZONE2 Sweets house | House construction with sweets block | ★ | | Forms creative shapes with blocks that can be freely moved and assembled and obtains a space sensees curiosity about artistic | 18 minutes |
| | Interactive maze table | ★ | | Enhances recognition and utilization of rules through enquiring processes of creating maze roads | 0 minutes |
| ZONE3 Palette swamp | Bush exploration | ★ | | Improves space perception abilities by allowing a child to pass through complex obstacles and climb up and down a sloping hill | 2 minutes |
| | Palette swamp | ★ | | Achieves emotional development and stimulates physical sensations by allowing a child to experience various colors and muddy texture of the swamp | 1 minutes |
| ZONE4 Jungle hill | Low jungle playground | | | Enhances basic physical athletic ability by using various aspects of a body in the jungle playground | 21 minutes |
| | Twin pebble cave | | | Develops creativity and improves verbal expression abilities though experiences of listening and talking to peers in pocket space | 2 minutes |
| | High jungle playground | | | Enhances a sense of balance of a body and enhances a control power through challenging play experiences obtained from rock faces and slides of various difficulty levels | 16 minutes |
| ⋮ | ⋮ | ⋮ | ⋮ | ⋮ | ⋮ |

FIG. 4A

| | | | | | |
|---|---|---|---|---|---|
| ⋮ | ⋮ | ⋮ | ⋮ | ⋮ | ⋮ |
| ZONE4 Jungle hill | Tactile impression cave | ★ | 🨂⏲ | Enhances cognitive skills and promotes sensitivity development while experiencing tactile impressions through a whole body in a tunnel decorated with various materials | 4 minutes |
| | Silkworm cocoon cave | ★ | 🚜🎁 | Expresses creative movements according to child's ability through play activities of putting color strings in zigzags to meet challenges together with peers | 0 minutes |
| | Extra-large imagination forest puzzle | ★ | 🎨🚜 | Improves pattern and color perception abilities by creatively forming an overall forest image through turning puzzle pieces | 95 minutes |
| | Interactive ball game | ★ | 🨂✋ | Raises body coordination abilities and acquires social play rules through media experience of breaking block pieces by hitting a ball in a screen | 1 minutes |
| ZONE5 Stump | Bird egg nest | ★ | 💭🚜 | Promotes linguistic and social development by expressing play situations and roles in language | 29 minutes |
| | Animal sound pipe | ★ | 💭😀 | Provides dramatic play experiences while exploring and interacting with sounds | 14 minutes |
| | Forest rest area | | 💭😀 | Obtains emotional stability and charges energy while reading a book or spending time with parents for communication | 23 minutes |
| | Forest baby playground | | 🨂🚜 | Provides a playground for younger siblings, and may achieve integrated development of five senses in early infancy through toys for play activities such as a manipulative play activity | 15 minutes |
| ZONE6 Deep cave | Interactive media play | ★ | 🨂✋ | Enhances creativity while learning play rules by actively exploring and utilizing media usage methods and freely performing expressions in child's own way | 6 minutes |
| Total play time | | | | | Total 251 minutes |
| Idle time | | | | This is the remaining time except for play activities, which defines a play exploration time required for watching play activities of peers or moving to other play spaces. | 21 minutes |
| Special activities | Creative studio | – | – | Experiences creative activities of realizing imagination based on 20 design themes related to architecture, crafts, fashion, etc. | 2 minutes |
| | Imagination cabin | – | – | Enhances an emotional bond and creative expression abilities through collaboration work with family by using an imagination package (kit) | 18 minutes |
| Play type | 🨂 Physical play  🎁 Creative expressive play  💭 Cognitive exploratory play  🚜 Constructive play  😀 Dramatic play  ✋ Games with rules | | | | |

FIG. 4B

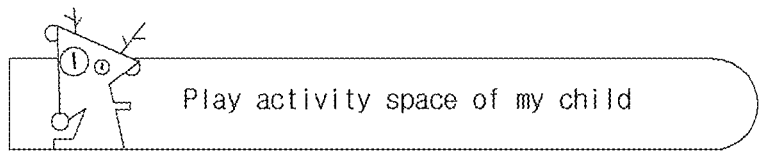
Play activity space of my child
Children experience various social play activities depending on a size of the space.
☞ Check out group activity spaces your child has visited in the playground.
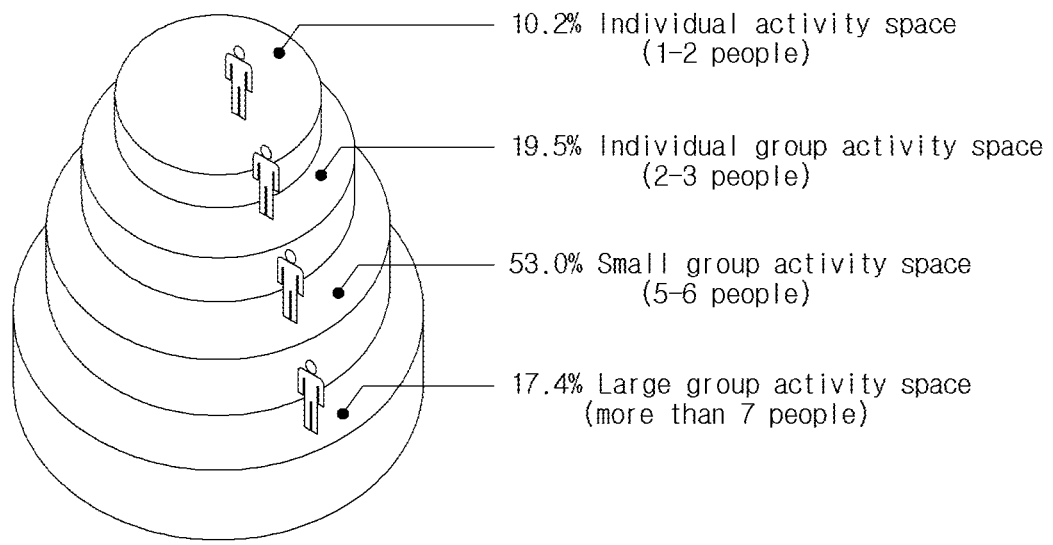
- 10.2% Individual activity space (1-2 people)
- 19.5% Individual group activity space (2-3 people)
- 53.0% Small group activity space (5-6 people)
- 17.4% Large group activity space (more than 7 people)
FIG. 4F

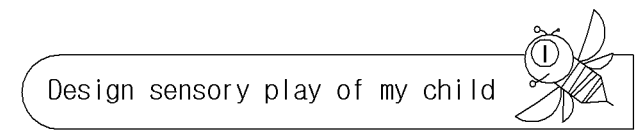

Design sensory play of my child

Through a process of exploring basic elements of design through play, children develop a sense of creative expression.

☞ Check out the design elements your child has experienced in the playground.

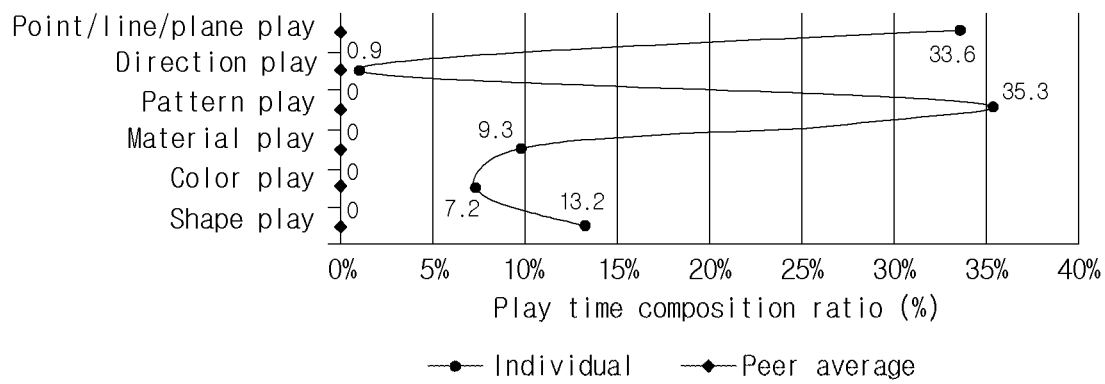

※ Children's play can be influenced by the conditions of the day and peer relationships. With continuous reporting participation, results of your children's play activities are accumulated, and you can be provided with more reliable observation reports.

FIG. 4G

| | Scanner identifier | Beacon identifier | Reception time | |
|---|---|---|---|---|
| 1st | | | | Entry data |
| 2nd | Scanner identifier | Beacon identifier | Reception time | |
| ⋮ | ⋮ | ⋮ | ⋮ | |
| 50th | Scanner identifier | Beacon identifier | Reception time | Exit data |

FIG. 7

| Playground name | Play activities | Entry time | Exit time | Play time (minutes) |
|---|---|---|---|---|
| Spring (Zone1) | Atelier | 9:31 | 9:35 | 4 |
| Sweets house (Zone2) | House construction with sweets block | 9:36 | 9:54 | 18 |
| Palette swamp (Zone3) | Bush exploration | 9:55 | 9:57 | 2 |
| | Palette swamp | 9:58 | 9:59 | 1 |
| Jungle hill (Zone4) | Low jungle playground | 10:00 | 10:21 | 21 |
| | Twin pebble cave | 10:22 | 10:24 | 2 |
| | High jungle playground | 10:25 | 10:41 | 16 |
| | Tactile impression cave | 10:42 | 10:46 | 4 |
| | Extra-large imagination forest puzzle | 10:47 | 12:22 | 95 |
| | Interactive ball game | 12:23 | 12:24 | 1 |
| Stump (Zone5) | Bird egg nest | 13:30 | 13:59 | 29 |
| | Animal sound pipe | 14:00 | 14:14 | 14 |
| | Forest rest area | 14:15 | 14:38 | 23 |
| | Forest baby playground | 14:39 | 14:54 | 15 |
| Deep cave (Zone6) | Interactive media play | 14:55 | 15:01 | 6 |
| | | | Total | 251 |
| Free time | Movement and free activities | 15:02 | 15:23 | 21 |
| Special activities | Creative studio | 15:24 | 15:26 | 2 |
| | Imagination cabin | 15:27 | 15:45 | 18 |

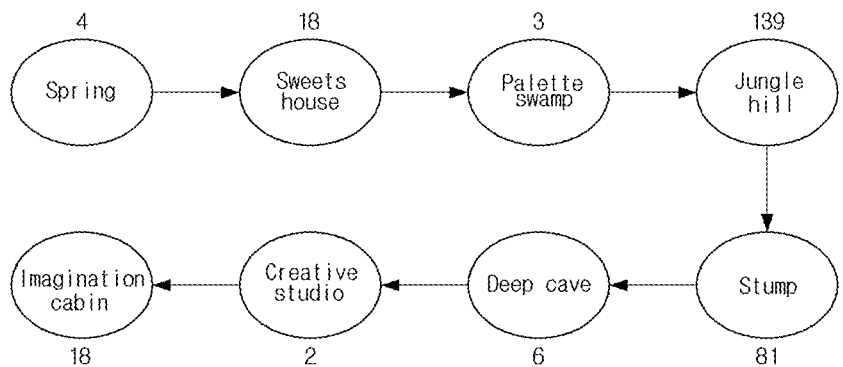

FIG. 8

[Play pattern 1]

| Playground name | Sensory play activity | Design sensory play | Play type | Play time |
|---|---|---|---|---|
| ZONE1 Spring | Atelier | ★ | 🎁🏠 | 4 minutes |
| ZONE2 Sweets house | House construction with sweets block | ★ | 🎁🏠 | 18 minutes |
| | Interactive maze table | ★ | 🧠👁 | 0 minutes |
| ZONE3 Palette swamp | Bush exploration | ★ | 👕🧠 | 2 minutes |
| | Palette swamp | ★ | 🎁🧠 | 1 minutes |
| ZONE4 Jungle hill | Low jungle playground | | 👕🧠 | 21 minutes |
| | Twin pebble cave | | 👕👁 | 2 minutes |
| | High jungle playground | | 👕🧠 | 16 minutes |
| ⋮ | ⋮ | ⋮ | ⋮ | ⋮ |

FIG. 9A

| | | | | |
|---|---|---|---|---|
| | ⋮ | ⋮ | ⋮ | ⋮ | ⋮ |
| ZONE4 Jungle hill | Tactile impression cave | ★ | 👣👁 | 4 minutes |
| | Silkworm cocoon cave | ★ | 🧱🎬 | 0 minutes |
| | Extra-large imagination forest puzzle | ★ | 🎬🧱 | 95 minutes |
| | Interactive ball game | ★ | 👣✋ | 1 minutes |
| ZONE5 Stump | Bird egg nest | ★ | 👁🧱 | 29 minutes |
| | Animal sound pipe | ★ | 👁😊 | 14 minutes |
| | Forest rest area | | 👁😊 | 23 minutes |
| | Forest baby playground | | 👣🧱 | 15 minutes |
| ZONE6 Deep cave | Interactive media play | ★ | 👣✋ | 6 minutes |
| Total play time | | | | Total 251 minutes |
| Idle time | | | | 21 minutes |
| Special activities | Creative studio | - | - | 2 minutes |
| | Imagination cabin | - | - | 18 minutes |

| Play type | 👣 Physical play  🎬 Creative expressive play  👁 Cognitive exploratory play |
|---|---|
| | 🧱 Constructive play  😊 Dramatic play  ✋ Games with rules |

FIG. 9B

| Diki-Diki Play reporting system | | ⌂ HOME |
|---|---|---|
| 👤 New registration | | |
| Kid's Name | Please enter the kid's name | |
| Date of Birth (YYMMDD) | Please enter the first six digits of your resident registration number (YYMMDD) | |
| Gender | ● Boy ○ Girl | |
| Nationality | ● Domestic ○ Overseas | |
| Parent's Name | Please enter the parent's name | |
| Relationship | e.g. Father/Mother/Aunt, etc. | |
| Mobile | Exclude '-' | |
| Beacon No. | | |

☑ Agree
I agree that dikidiki save's my personal infomation agree to the dikidiki privacy policy

[⊕ Submit]  [✗ Cancel]

FIG. 10C

| Diki-Diki Play reporting system | |
|---|---|
| 🖼 Revisitation registration | |
| Kid's Name | Kim00 |
| Date of Birth (YYMMDD) | 20150101 |
| Gender | Boy |
| Parent's Name | Kim00 |
| Relationship | Father |
| Mobile | 01085939496 |
| Beacon No. | 1 |

⊕ Submit    ✗ Cancel

FIG. 10D

Individual user
Individual visiting user information is registered and managed.

① Add user

⌂ Home/User management/Individual user

| No. | Name | Classification | Gender | Age | Parent | Contact number | Number of visits | Final visit date | Management |
|---|---|---|---|---|---|---|---|---|---|
| 1 | Kim00 | Local | Female | Age 4 (2014) | Choi00 | 010-****** | 1 | 2017-10-31 | ④ |
| 2 | Park00 ③ | Local | Male | Age 4 (2014) | Choi00 | 010-****** | 1 | 2017-10-31 | |
| 3 | Ahn00 | Foreigner | Male | Age 7 (2011) | Park00 | 010-****** | 1 | 2017-10-31 | |
| 4 | Seo00 | Foreigner | Female | Age 4 (2014) | Jeon00 | 010-****** | 1 | 2017-10-31 | |
| 5 | Bae00 | Local | Male | Age 4 (2009) | Kim00 | 010-****** | 1 | 2017-10-31 | |
| 6 | Kang00 | | | | | | | 2017-10-31 | |
| 7 | Kim00 | | | | | | | 2017-10-31 | |
| 8 | Yoon00 | | | | | | | 2017-10-31 | |
| 9 | Lee00 | | | | | | | 2017-10-31 | |
| 10 | Lee00 | | | | | | | 2017-10-31 | |
| 11 | Lim00 | | | | | | | 2017-10-31 | |

⑤
▓ Beacon registration
Please enter the serial number recorded in a beacon bracelet of the user.
Serial number
Serial number recorded in beacon bracelet Service provision and usage agreement ☑  See terms and conditions
Personal information privacy policy agreement ☑  See terms and conditions
Location information agreement ☑  See terms and conditions Cancel  Submit

FIG. 11

Individual user details
Detailed information of the entered user is viewed.

Home/Facility management/Individual user

① Kim ○○(M000005073)  •Parent: Choi ○○
Age 3 (2014)/Female/Initial registration on 2017-10-31  •Relationship: Mother
 •Contact number: 010*****

| No | Visit date | Stay time | Entering time | Exiting time | Service provision and usage agreement | Personal information privacy policy agreement | Location information agreement | Beacon | Report | View |
|----|------------|-----------|---------------|--------------|---------------------------------------|----------------------------------------------|-------------------------------|--------|-------------------|------|
| ② 1 | 2017-10-31 | 72 minutes | 16:40 | 17:53 | Y | Y | Y | 14 | R171006851 | Record sheet / Result sheet ③ |

④ List

FIG. 14

Play facilities
Information on play facilities is registered and managed.

⌂ Home/Facility management/Play facilities

Filter: [Search 🔍]   ①[Add play facility]

Show: [10 ▾]

| No. | Play zone | Facility name | Operation state | Registration date | Management ② |
|---|---|---|---|---|---|
| 1 | Imagination forest spring | Imagination forest entrance | Y | 2017-09-03 | ④ ☒ 🗑 |
| 2 | ③ Imagination forest spring | Diki-Diki photo zone | Y | 2017-08-30 | ☒ 🗑 |
| 3 | Imagination forest spring | Ticket office (Beacon desk) | ⑤ Y | 2017-08-30 | ☒ 🗑 |
| 4 | Imagination forest spring | Honeybee house | Y | 2017-08-30 | ☒ 🗑 |
| 5 | Imagination forest spring | Baby carriage storage | Y | 2017-08-30 | ☒ 🗑 |
| 6 | Imagination forest sweets house | Hill scribble place | Y | 2017-08-30 | ☒ 🗑 |
| 7 | Imagination forest sweets house | Butterfly magnet plate | Y | 2017-08-30 | ☒ 🗑 |
| 8 | Imagination forest sweets house | Designer drawing board | Y | 2017-08-30 | ☒ 🗑 |
| 9 | Imagination forest concert hall | House construction with sweets block | Y | 2017-08-30 | ☒ 🗑 |
| 10 | Imagination forest concert hall | Sweets cart | Y | 2017-08-30 | ☒ 🗑 |

Showing 1 to 10 of 47 entries

First < [1] 2 3 4 5 > First

FIG. 15

Beacon
Beacon information is registered and managed.

⌂ Home/Facility management/Beacon

Filter: [Search 🔍]

① [Add beacon]

Show: [10 ∨]

| No. | Management number | Beacon information | Battery | Use state | Registration date | Management |
|---|---|---|---|---|---|---|
| 1 | 1 | C100AD0CC086/0/0 | 100% | Y | 2017-09-03 | ④ 🗑 ✏ |
| 2 | 2 ③ | C100AD0CC011/0/0 | 100% | Y | 2017-09-03 | 🗑 ✏ |
| 3 | 3 | C100AD0CC01F/0/0 | 100% | ⑤ Y | 2017-09-03 | 🗑 ✏ |
| 4 | 4 | C100AD0CC04F/0/0 | 100% | Y | 2017-09-03 | 🗑 ✏ |
| 5 | 5 | C100AD0CC05E/0/0 | 100% | Y | 2017-09-03 | 🗑 ✏ |
| 6 | 6 | C100AD0CC03C/0/0 | 48% | Y | 2017-09-03 | 🗑 ✏ |
| 7 | 7 | C100AD0CC009/0/0 | 31% | Y | 2017-09-03 | 🗑 ✏ |
| 8 | 8 | C100AD0CC05F/0/0 | 29% | Y | 2017-09-03 | 🗑 ✏ |
| 9 | 9 | C100AD0CC066/0/0 | 33% | Y | 2017-09-03 | 🗑 ✏ |
| 10 | 10 | C100AD0CC01E/0/0 | 100% | Y | 2017-09-03 | 🗑 ✏ |

Showing 1 to 10 of 500 entries

First < [1] 2 3 4 5 ...50 > First

FIG. 16

Scanner
Scanner information is registered and managed.

⌂ Home/Facility management/Scanner

① Add scanner

Filter: Search 🔍

Show: 10 ＞

| No. | Classification | Nickname | Use state | Registration date ② | Management |
|---|---|---|---|---|---|
| 1 | Fixed type | 3(Maze castle) | Y | 2017-10-31 | ④ ✎ 🗑 |
| 2 | ③ Fixed type | 21(F&B) | Y | 2017-09-22 | ✎ 🗑 |
| 3 | Fixed type | 19(Imagination cabin) | ⑤ Y | 2017-09-20 | ✎ 🗑 |
| 4 | Fixed type | 18(Creative studio) | Y | 2017-09-19 | ✎ 🗑 |
| 5 | Fixed type | 17(Interactive media play) | Y | 2017-09-18 | ✎ 🗑 |
| 6 | Fixed type | 16(Babe playground) | Y | 2017-09-17 | ✎ 🗑 |
| 7 | Fixed type | 15(Forest rest area) | Y | 2017-09-16 | ✎ 🗑 |
| 8 | Fixed type | 14(Animal sound pipe) | Y | 2017-09-15 | ✎ 🗑 |
| 9 | Fixed type | 13(Stump) | Y | 2017-10-14 | ✎ 🗑 |
| 10 | Fixed type | 12(Interactive ball game) | Y | 2017-09-13 | ✎ 🗑 |

Showing 1 to 10 of 30 entries

First ＜ 1 2 3 ＞ First

FIG. 17A

PLAY ACTIVITY TRACKING SYSTEM AND METHOD

CROSS-REFERENCE TO RELATED APPLICATIONS

This application claims the benefit and priority of Korean Patent Application 10-2017-0163589, filed Nov. 30, 2017, the entire disclosure of which is incorporated herein by reference.

BACKGROUND OF THE INVENTION

1. Field of the Invention

The present invention relates to a play activity tracking system and a play activity tracking method, and more particularly, to a play activity tracking system and a play activity tracking method, in which, when a child walks around each of a plurality of sensory play spaces constructed based on a kindergarten Nuri curriculum and a career maturity test theory of Ministry of Education and performs a play activity excitingly while wearing a beacon device, individual play patterns are monitored and collected through beacon devices worn by children, and the collected data is analyzed in real time according to various indicators (play facility-based interest level/design sense/visit history of participant/age-based comparison index, etc.) to print out a comprehensive play result on a play report result sheet, so that the play report result sheet is used as a reference for well-rounded development of each child.

2. Description of the Related Art

In general, infants, toddlers, and school-aged children may not be self-reliant, so that mental and physical growth environments are frequently provided in play facilities under protection of parents.

Although general play facilities are distributed mainly at areas in vicinity of apartments or residential areas, the general play facilities are not properly managed, and it is difficult to know whether a safety check has been done properly, so that parents are concerned about the general play facilities.

Accordingly, parents allow children to play at charged children's playrooms where management and safety checks are being performed, or at playrooms installed in nursery schools with management teachers.

However, these play facilities are insufficient to induce interest of the children in recent years, and merely allows the children to simply play without knowing influence of each play device in the playroom on well-rounded development of each child.

DOCUMENTS OF RELATED ART

Patent Documents (Patent document 1) Korean Patent Application Publication No. 10-2013-0000204 (published on Jan. 2, 2013)

SUMMARY OF THE INVENTION

To solve the problems described above, an object of the present invention is to provide a play activity tracking system and a play activity tracking method, in which, when a plurality of sensory play spaces are constructed based on a kindergarten Nuri curriculum and a career maturity test theory of Ministry of Education, and a child walks around each of the play spaces and performs a play activity excitingly while wearing a beacon device, individual play patterns are monitored and collected through beacon devices worn by children, and the collected data is analyzed in real time according to various indicators (play facility-based interest level/design sense/visit history of participant/age-based comparison index, etc.) to print out a comprehensive play result on a play report result sheet, so that the play report result sheet is used as a reference for well-rounded development of each child.

To achieve the objects described above, according to an embodiment of the present invention, there is provided a play activity tracking system including: at least one beacon device worn on a body of a user who walks around a plurality of play spaces and performs a play activity to output a beacon signal at a predetermined time interval; at least one beacon scanner disposed at each of the play spaces to transmit entry data by scanning the beacon signal transmitted from the beacon device entering each of the play spaces and to transmit exit data by scanning the beacon signal transmitted from the beacon device exiting from each of the play spaces; a data collection and analysis device for receiving the entry data and the exit data for each user from the at least one beacon scanner, generating user-based location tracking data based on the received entry data and the received exit data for each user, and generating a play pattern for each user by analyzing the generated user-based location tracking data; and a play report device for generating a comprehensive play report for each user based on the generated play pattern for each user to print out the generated comprehensive play report for each user on a report result sheet, in which the comprehensive play report includes a play facility-based interest level, a design sense level, a visit history, and an age-based comparison index.

In addition, the play activity tracking system may further include a play report database (DB) for storing a name and an ID of each of the play spaces, unique identification information of the beacon scanner corresponding to each of the play spaces, an image of a play map on which the play spaces are disposed, the play pattern for each user, and the comprehensive play report for each user.

In addition, the play report DB may be configured to: store a playground name, a sensory play activity, design sensory play availability, a play type, and a play activity property correspondingly to each of the play spaces; and store a user name, a play date, age, gender, a number of visits, a most played activity, a play time in each of playground names, a total play time, a remaining time except for the play activity, an image showing a play time for each of play activities on a map, a time distribution chart for each play according to a past visit history, a graph comparing a play time of the user with a peer average play time over the play type, an occupancy level of a group activity space occupied by the user according to a space size, and a design element graph according to an occupancy rate of each of the play spaces, with respect to the comprehensive play report for each user.

In addition, the play activity tracking system may further include a user registration device for receiving and registering information on the user who walks around the play spaces and performs the play activity, and registering a beacon management number of the beacon device worn on the body of the user correspondingly to the information on the user; and a management device for managing an overall usage status for the play spaces, a status for each of play activities, and a user status, managing information on individual users and group users, monitoring the beacon scanner for each of the play spaces to manage a monitoring result as data, managing states of the at least one beacon scanner and the at least one beacon device as data, managing an evaluation index, the play activity, and a measurement index according to the comprehensive play report for each user, and managing visitor statistics, usage time zone statistics, revisitation rate statistics, statistics for each of measurement indexes, statistics for each of play times, and peer average statistics.

In addition, the beacon scanner may transmit unique identifier of the beacon scanner corresponding to the play space which corresponds to a communication area of the beacon scanner, the entry data related to a time at which an entry beacon signal transmitted from the beacon device entering the play space is received, and the exit data related to a time at which an exit beacon signal transmitted from the beacon device exiting from the play space is received to the data collection and analysis device.

In addition, the data collection and analysis device may be configured to recognize a playground name of the play space corresponding to the unique identifier of the beacon scanner, recognize the time at which the entry beacon signal is received in the play space through the entry data, recognize the time at which the exit beacon signal is received in the play space through the exit data, and calculate a play stay time in the play space by subtracting the time at which the entry beacon signal is received from the time at which the exit beacon signal is received.

In addition, the data collection and analysis device may be configured to generate the user-based location tracking data according to a time sequence by arranging an entry time and an exit time of each of the play spaces for each user according to the time sequence, and correspondingly arranging the playground name of each of the play spaces according to the time sequence.

In addition, the data collection and analysis device may be configured to analyze the generated user-based location tracking data to generate a table representing a sensory play activity, design sensory play availability, a play type, a play activity property, and a play time which correspond to each of playground names, and the play pattern for each user including a play time map indicating the play time for each of play activities on a map, a distribution chart over the play type in which the play time for each date is expressed on a percentage basis according to the play type, a play time graph comparing the play time with a peer average play time, an occupancy level of a group activity space that indicates a play time occupancy rate for each of group activity spaces, and a design sensory play distribution chart representing the play time over a design element.

In addition, the play report device may generate the comprehensive play report for each user based on the generated play pattern for each user to print out the generated comprehensive play report for each user on the report result sheet, in which the comprehensive play report includes a user name, a play date, age, gender, a number of visits, a most played activity, a play time in each of playground names, a total play time, a remaining time except for the play activity, an image showing the play time for each of play activities on a map, a time distribution chart for each play according to a past visit history, a graph comparing the play time of the user with a peer average play time over a play type, an occupancy level of a group activity space occupied by the user according to a space size, and a design sensory play distribution chart representing the play time over a design element.

In addition, the user registration device may preprocess beacon data collected from the beacon scanner in association with the registered user information, and may register the user information and the beacon scanner by matching the user information and the beacon scanner with the beacon management number of the beacon device.

In addition, the management device may provide a web-based management program capable of monitoring and inquiring an operation status of equipment arranged in each of the play spaces in real time, manage a usage status for each user registered through the user registration device, manage a facility of each of the play spaces with data, manage evaluation data according to the comprehensive play report for each of individuals, and manage a statistics status based on the evaluation data.

In addition, the play report device may be configured to: generate the visit history for each user by classifying the user-based location tracking data or data about the comprehensive play report for each user by a date; and monitor status data of the beacon scanner and status data of the beacon device operated in each of the play spaces in real time.

Meanwhile, to achieve the objects described above, according to an embodiment of the present invention, there is provided a play activity tracking method of a system including at least one beacon device worn on a body of a user who walks around a plurality of play spaces and performs a play activity, a user registration device for registering the user, at least one beacon scanner disposed at each of the play spaces, a data collection and analysis device for collecting data of the beacon scanner, and a play report device communicating with the data collection and analysis device. The play activity tracking method includes: registering, by the user registration device, the user by receiving user information; matching, by the user registration device, a single beacon device with the received user information; receiving, by the beacon scanner, a beacon signal from the beacon device; transmitting, by the beacon scanner, entry data and exit data for each user with respect to the play space based on the received beacon signal; generating, by the data collection and analysis device, user-based location tracking data based on the received entry data and the received exit data for each user; generating, by the data collection and analysis device, a play pattern for each user by analyzing the generated user-based location tracking data; and generating, by the play report device, a comprehensive play report for each user based on the play pattern for each user to print out the generated comprehensive play report for each user on a report result sheet.

In this case, the registering of the user may include receiving the user information including a name, age, gender, a parent name, and a contact number of the user and storing the user information in the play report database to register the user.

In addition, the matching of the single beacon device may include performing the matching by storing a beacon management number of the beacon device matched with the user information in a play report database correspondingly to the user information.

In addition, the receiving of the beacon signal may include receiving, by the beacon scanner, an entry beacon signal transmitted when the beacon device enters the play space which corresponds to a communication area of the beacon scanner, receiving the beacon signal from the beacon device in the play space at a predetermined time interval, and receiving an exit beacon signal transmitted when the beacon device exits the play space.

In addition, the transmitting of the entry data and the exit data for each user may include transmitting, by the beacon scanner, unique identifier of the beacon scanner corresponding to the play space which corresponds to the communication area of the beacon scanner, the entry data related to a time at which the entry beacon signal is received, and the exit data related to a time at which the exit beacon signal is received to the data collection and analysis device.

In addition, the generating of the user-based location tracking data may include recognizing, by the data collection and analysis device, a playground name of the play space corresponding to the unique identifier of the beacon scanner, recognizing the time at which the entry beacon signal is received in the play space through the entry data and the time at which the exit beacon signal is received in the play space through the exit data, and calculating a play stay time in the play space by subtracting the time at which the entry beacon signal is received from the time at which the exit beacon signal is received.

In addition, the generating of the user-based location tracking data may include generating, by the data collection and analysis device, the user-based location tracking data according to a time sequence by arranging an entry time and an exit time of each of the play spaces for each user according to the time sequence, and correspondingly arranging the playground name of each of the play spaces according to the time sequence.

In addition, the generating of the play pattern for each user may include analyzing, by the data collection and analysis device, the generated user-based location tracking data to generate a table representing a sensory play activity, design sensory play availability, a play type, a play activity property, and a play time which correspond to each of playground names, and the play pattern for each user including a play time map indicating the play time for each of play activities on a map, a distribution chart over the play type in which the play time for each date is expressed on a percentage basis according to the play type, a play time graph comparing the play time with a peer average play time, an occupancy level of a group activity space that indicates a play time occupancy rate for each of group activity spaces, and a design sensory play distribution chart representing the play time over a design element.

In addition, the printing out on the report result sheet may include generating, by the play report device, the comprehensive play report for each user based on the generated play pattern for each user to print out the generated comprehensive play report for each user on the report result sheet, in which the comprehensive play report includes a user name, a play date, age, gender, a number of visits, a most played activity, the play time in each of the playground names, a total play time, a remaining time except for the play activity, an image showing the play time for each of play activities on a map, a time distribution chart for each play according to a past visit history, a graph comparing the play time of the user with the peer average play time over the play type, the occupancy level of the group activity space occupied by the user according to a space size, and the design sensory play distribution chart representing the play time over the design element.

Other aspects, advantages, and features of the present invention will be more clearly understood from the description disclosed in the entire specification including the following sections: Brief Description of the Drawings; Detailed Description of the Invention; and Claims.

According to the present invention, when participants (children) freely play in a space where a sensitivity play program developed based on a kindergarten Nuri curriculum (social relations, art experiences, physical exercise and health, nature exploration, and communication) and a career maturity test theory of Ministry of Education (Multiple Intelligence by professor Howard Gardner in Harvard university) is applied, reaction of the participants is tracked in real time through various advanced technologies hidden in the field, and an experience index is analyzed to print out a personalized comprehensive play report, so that the personalized comprehensive play report can be used as a reference for well-rounded development of each of the participants (children).

Therefore, in the play space according to the present invention, a child excitingly plays while experiencing fun and exciting five-sense experiences and sensory play with various design arts, and such a process can help the child to naturally develop senses of the child and to grow up to find sensitivity.

In addition, it is possible to provide a play activity report that reflects objective and scientific data rather than individual and subjective determination about various play experiences of the child in a plurality of play spaces.

In addition, it is possible to provide a comprehensive play report based on objective play activity measurement according to autonomous decision, preference, interest, concentration, and acceptance of a play participant, rather than a play activity report according to a specific leader or a guide.

In addition, the play report result sheet is set based on a play type which is directly developed based on a preset educational goal, so that the play report result sheet can be used as a reference for well-rounded development of a player.

In addition, the play report result sheet is provided with three (TOP3) play activity information in which a user (child) has played the most, so that the favorite play activity of the child can be confirmed at one view.

In addition, a report that reflects the persistence of measurement rather than one-time instantaneous measurement with respect to a history of activities performed by the participant in the play spaces, so that sensory development and a change of the play activity of the play participant can be measured.

In addition, individual comprehensive play data on individual experience results in each of the play spaces is constructed as the big data, so that a play activity index can be extracted based on the big data.

In addition, related data can be extracted by applying various play activities.

In addition, various additional products can be developed by utilizing accumulated big data.

In addition, play activities performed by play participants in each of the play spaces can be tracked and monitored.

In addition, a usage status over age and a usage status over gender of the play participants can be monitored.

In addition, changes in a play usage status of revisitation play participants can be monitored.

In addition, personalized reports can be provided according to monitoring results of the play participants.

In addition, play usage monitoring results according to an individual comprehensive play report can be applied to program guidance and education method guidance.

In addition, an individual tracking system (play stay time, preference, and activity pattern data analysis) of collected data can be implemented by an IoT (Internet of Things) location tracking device.

In addition, it is possible to realize an experience index personalized reporting system that analyzes the collected data to divide the collected data by various indicators (stay time for each of play facilities, visit history of participants, and overall average record over age), and provides final analysis results on-line and off-line.

In addition, parents of the play participant can check the play participant (child) by searching for play statuses every time and searching for a variation of play patterns.

In addition, it is possible to realize a big data analysis system necessary for facility operation improvement and marketing such as a usage path and a stay time of the participant for overall play facilities, statistics on according to gender/age of a user.

In addition, the play activity and the play report result sheet reflecting the play activity can be continuously updated and customized.

In addition, it is possible to realize an integrated management system capable of registering an IoT scanner and a transmission device, performing user personal information-associated preprocessing, and monitoring an equipment operation state in real time.

In addition, in terms of the play participant, the present invention can be utilized as a play index which can represent a play form, a play pattern, play preference, play concentration, and play sensitivity of the play participant, and parents can use 'personalized reports' to identify preference, concentration, excellence of the play participant (child), and can even find demands of the child.

In addition, in terms of educators, kindergarten teachers can check individual play patterns and properties of kindergarten students who are in charge of the teachers, so that the individual play patterns and properties can be utilized in kindergarten teaching methods.

In addition, in terms of edutainment program developers, preference, interest, concentration, and acceptance of the play participant can be recognized so as to be utilized to develop educational programs according to play patterns and to develop products according to play preferences, and the experience index based on the big data can scientifically present a state of an individual play participant while suggesting a development direction of the play participant.

BRIEF DESCRIPTION OF THE DRAWINGS

FIGS. 4A to 4B and FIGS. 4C to 4G are views showing an example of a comprehensive play report for each user printed out from a play report device according to the embodiment of the present invention.

FIG. 7 is a view showing transmission formats of entry data and exit data for each user with respect to each of play spaces, which are transmitted from a beacon scanner according to the embodiment of the present invention.

FIG. 8 is a view showing an example of generating user-based location tracking data by a data collection and analysis device according to the embodiment of the present invention.

FIGS. 9A to 9F are views showing a play pattern for each user which is generated by analyzing the user-based location tracking data by the data collection and analysis device according to the embodiment of the present invention.

FIGS. 10A to 10D are views showing a screen for registering a user by receiving user information by a user registration device according to the embodiment of the present invention.

FIG. 11 is a view showing a screen for managing an individual user in the play activity tracking system according to the embodiment of the present invention.

FIG. 14 is a view showing user details on a user management screen of the play activity tracking system according to the embodiment of the present invention.

FIG. 15 is a view showing a screen for managing play facilities in the play activity tracking system according to the embodiment of the present invention.

FIG. 16 is a view showing a screen for managing a beacon device in the play activity tracking system according to the embodiment of the present invention.

FIG. 17A is a view showing a screen for managing a beacon scanner according to the embodiment of the present invention.

DETAILED DESCRIPTION OF THE INVENTION

Figure 1:
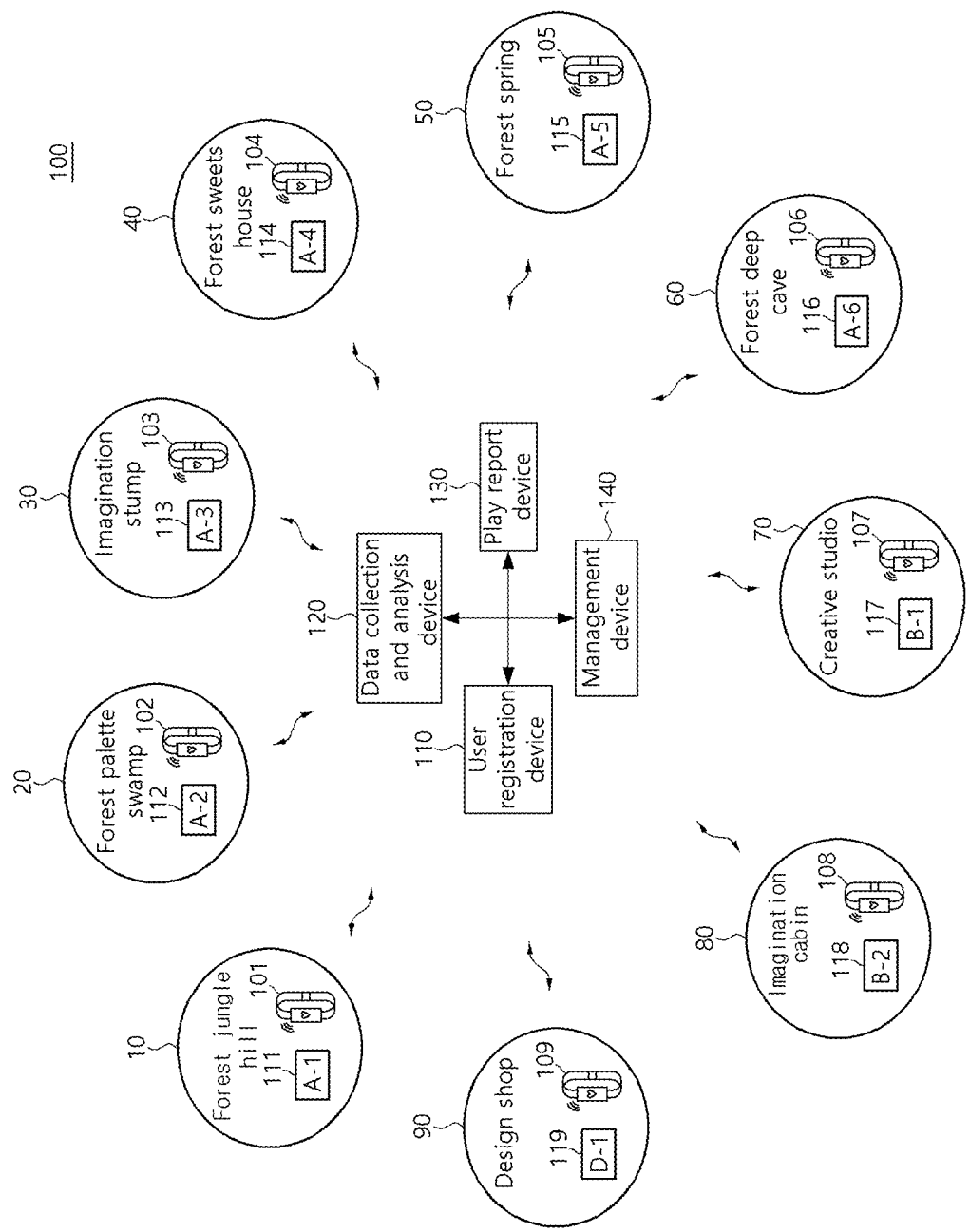
FIG. 1 is a block diagram schematically showing an overall configuration of a play activity tracking system according to an embodiment of the present invention.

Hereinafter, embodiments of the present invention will be described in detail with reference to the accompanying drawings, so that those skilled in the art to which the present invention pertains can easily implement the present invention. The present invention may be embodied in many different forms, but is not limited to embodiments described herein.

In order to clearly illustrate the present invention, parts that are not related to the description are omitted, and the same reference numerals are used to designate the same or similar elements throughout the specification.

Throughout the specification, it will be understood that when an element is referred to as being "connected" to another element, it may be "directly connected" or "electrically connected" to another element while being provided with other elements in between. In addition, when some part "includes" some elements, unless explicitly described to the contrary, it means that other elements may be further included but not excluded.

When an element is referred to as being "on" another element, it may be directly on top of another element or may include other elements in between. In contrast, an element is referred to as being "directly on" another element, no other elements are included in between.

Although terms such as "first", "second", and "third" may be used herein to describe various parts, components, regions, layers, and/or sections, but the elements should not be limited by the terms. The terms are only used to distinguish one part, component, region, layer, or section from another part, component, region, layer, or section. Therefore, a first part, component, region, layer, or section described below may be referred to as a second part, component, region, layer, or section without departing from the scope of the present invention.

The terminology used herein is intended to describe particular embodiments only, and is not intended to limit the present invention. Singular forms used herein include plural forms unless the phrases expressly indicate otherwise. The meaning of "comprising" used herein embodies certain characteristics, regions, integers, steps, operations, elements and/or components, and shall not be construed to preclude any presence or addition of one or more other characteristics, regions, integers, steps, operations, elements, and/or components.

Terms indicating relative spaces such as "under" or "over" may be used to more easily describe relationship between one element and another element shown in the drawings. The terms are intended to include alternative meanings or actions of a device in use, as well as meanings intended in the drawings. For example, when inverting a device in the drawings, certain portions described as being "under" other portions may be described as being "over" other portions. Thus, an exemplary term "under" includes both up and down directions. The device may rotate at 90 degrees or another angle, and the term indicating the relative space is interpreted accordingly.

Unless defined otherwise, all terms including technical and scientific terms used herein have the same meaning as how they are generally understood by those of ordinary skill in the art to which this invention pertains. Any terms that are defined in a general dictionary shall be further interpreted to have the meaning consistent with relevant technical documents and the present disclosure, and shall not be interpreted to have an idealistic or excessively formalistic meaning unless defined otherwise.

Hereinafter, embodiments of the present invention will be described in detail with reference to the accompanying drawings, so that those skilled in the art to which the present invention pertains can easily implement the present invention. However, the present invention may be embodied in many different forms, but is not limited to the embodiments described herein.

FIG. 1 is a block diagram schematically showing an overall configuration of a play activity tracking system according to an embodiment of the present invention.

Referring to FIG. 1, a play activity tracking system 100 according to an embodiment of the present invention includes: a plurality of play spaces 10 to 90; at least one beacon device 101 to 109; at least one beacon scanner 111 to 119; a user registration device 110; a data collection and analysis device 120; a play report device 130; and a management device 140.

The play spaces 10 to 90 are institutional, mechanical, artistic, sensory, and formative play spaces constructed according to a sensitivity play program developed based on a kindergarten Nuri curriculum (social relations, art experiences, physical exercise and health, nature exploration, and communication) and a career maturity test theory of Ministry of Education (Multiple Intelligence by professor Howard Gardner in Harvard university).

Figure 3:
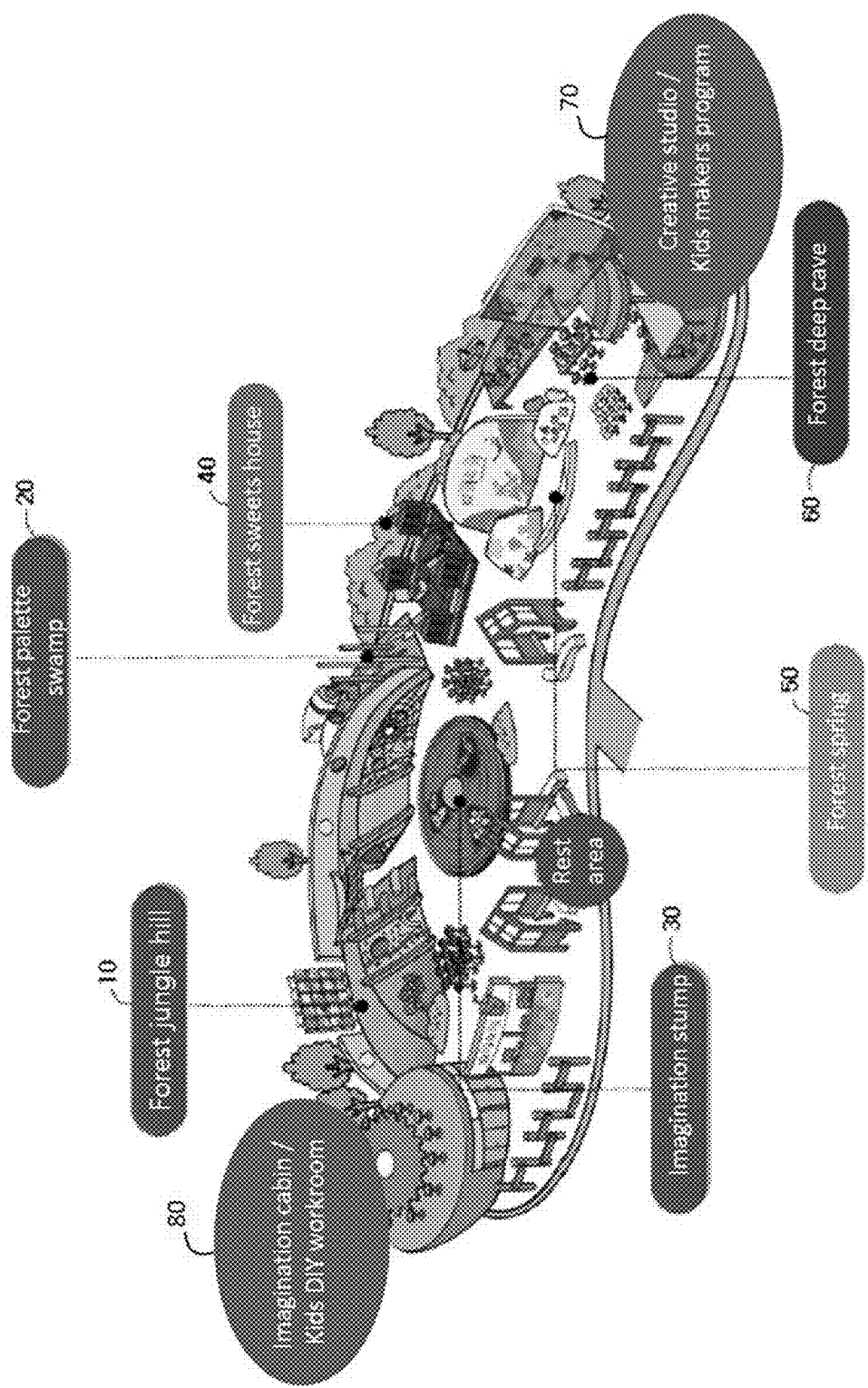
FIG. 3 is a view showing an example in which a plurality of play spaces where a user performs a play activity are arranged according to respective features according to the embodiment of the present invention.

In an embodiment of the present invention, as shown in FIG. 3, for example, the play spaces 10 to 90 may include: a forest jungle hill 10; a forest palette swamp 20; an imagination stump 30; a forest sweets house 40; a forest spring 50; a forest deep cave 60; a creative studio 70; an imagination cabin 80; and a design shop 90. FIG. 3 is a view showing an example in which a plurality of play spaces where a user performs a play activity are arranged according to respective features according to the embodiment of the present invention.

The forest jungle hill 10 is configured as a space where a user (child) freely jumps and rolls over jungle hills and hidden underground tunnels to emit energy, so that a balanced body sensation can be stimulated. To this end, the forest jungle hill 10 may include play zones such as a sky bridge, a jungle rock face, a wooden slide, a web and a spider cave, an underground tunnel, an extra-large imagination forest puzzle, a twin pebble cave, and an interactive ball game.

The forest palette swamp 20 is configured as a space where the user (child) searches for space design elements such as colors, textures, and patterns by exploring a palette swamp covered with paints. To this end, the forest palette swamp 20 may include play zones such as a bush exploration, a red-orange-yellow-green palette swamp, a rock playground, and a wooden ladder.

The imagination stump 30 is configured as a space where the user (child) talks to a friend with a tactile impression game that stimulates curiosity in a bird egg nest placed on a stump. To this end, the imagination stump 30 may include play zones such as the bird egg nest, an animal sound pipe, and an imagination forest pin art.

The forest sweets house 40 is configured as a space where the user (child) develops a space sense through an architectural play utilizing a special large sweets block. To this end, the forest sweets house 40 may include play zones such as a house construction with sweets blocks, and an interactive maze table.

The forest spring 50 is configured as a space where the user (child) expresses all imaginary things through a formative play such as coloring and crafting. To this end, the forest spring 50 may include play zones such as a hill scribble place and a butterfly magnet plate, or may be configured as a space to which an artist program inviting and playing together with a corresponding artist is applied seasonally.

The forest deep cave 60 is configured as a space where the user (child) expands design thinking skills through a sensitivity digital play utilizing shapes, colors, and patterns which are basic elements of design. To this end, the forest deep cave 60 may include play zones such as a digital design village, a magic color block, a digital canvas, or an avatar toy making.

The creative studio 70 is configured as a design creation space in which the user (child) plays with an artist or a professional institution. To this end, the creative studio 70 may be configured as a children's design club where professional and regular creative practice activities are performed based on 20 design themes related to architecture, fashion, etc.

The imagination cabin 80 is configured as a space used by the user (child) as a do-it-yourself (DIY) workroom utilizing various materials and kits. To this end, the imagination cabin 80 can be configured as an open creative workroom where the user can freely experience a design world of various topics such as a program with dad and an imagination package workshop.

The design shop 90 is configured as a space where the user (child) draws or creates various designs, or may be configured as a space for selling various design models such that the user can purchase an imitable design model.

Meanwhile, the user registration device 110 receives and registers information on the user who walks around the play spaces and performs the play activity, and registers a beacon management number of the beacon device worn on a body of the user correspondingly to the information on the user.

Figure 2:
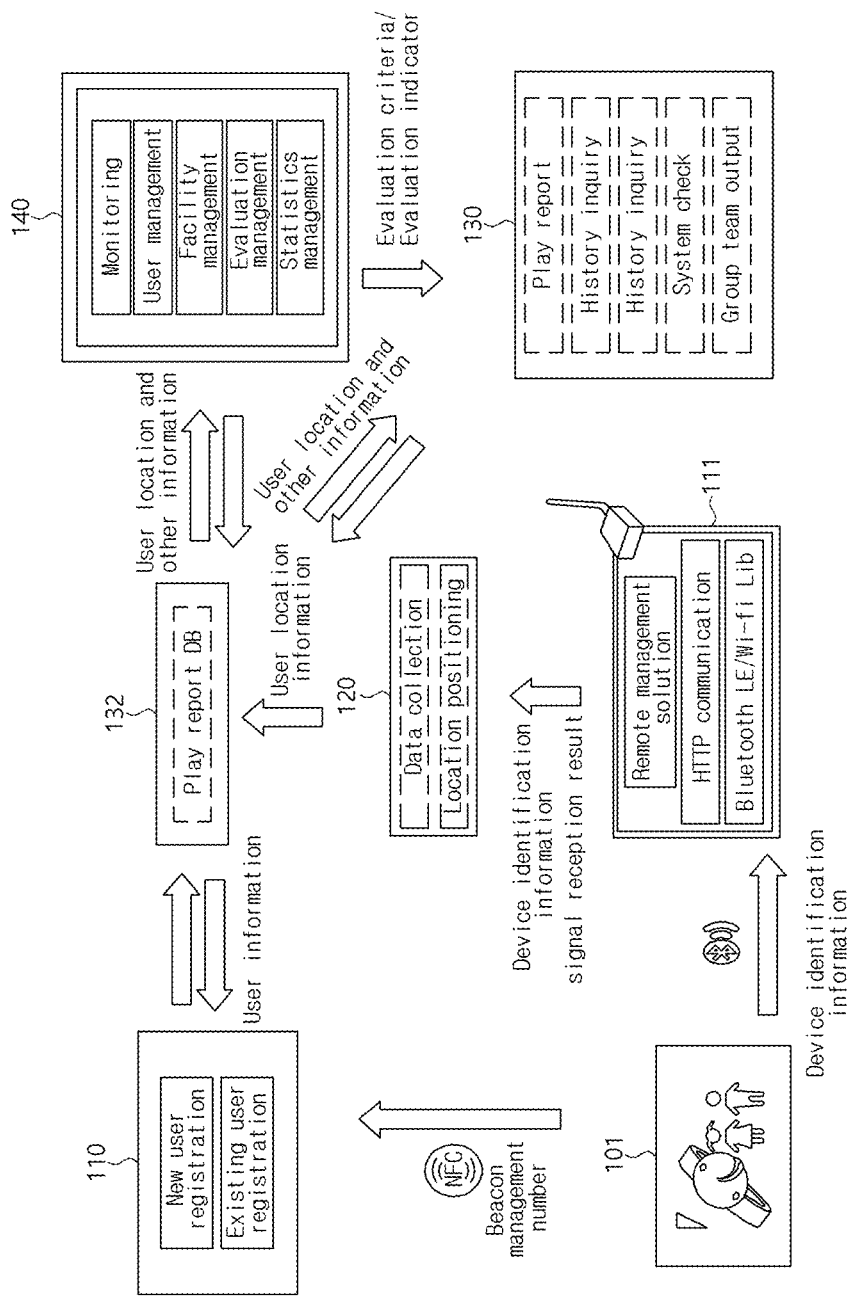
FIG. 2 is a view showing functional operations according to respective components of the play activity tracking system according to the embodiment of the present invention.

In this case, when registering a new user as shown in FIG. 2, the user registration device 110 may receive user information including a name, age, gender, a parent name, and a contact number of the user to register the user. FIG. 2 is a view showing functional operations according to respective components of the play activity tracking system according to the embodiment of the present invention.

In addition, the user registration device 110 stores input user information and the beacon management number of the beacon device matched with the user information in a play report database (DB) 132.

In addition, when registering a revisitation user as shown in FIG. 2, the user registration device 110 may retrieve previously registered user information from the play report DB 132 and match the beacon management number of the beacon device to register the user.

In addition, when matching the beacon management number of the beacon device with the user information, the user registration device 110 may allow a manager to directly input the beacon management number through a keyboard or to input the beacon management number by using near field communication (NFC).

In addition, the user registration device 110 may preprocess beacon data collected from the beacon scanner in association with the registered user information, and may register the user information and the beacon scanner by matching the user information and the beacon scanner with the beacon management number of the beacon device.

Meanwhile, at least one beacon device 101 to 109 is a device worn on a body of the user (child) who walks around the play spaces 10 to 90 described above and performs a play activity, in which the at least one beacon device 101 to 109 outputs a beacon signal at a predetermined time interval from a moment when a power is turned on. In this case, the beacon signal is a signal including device identification information as shown in FIG. 2, and can be transmitted in a near field communication manner such as Bluetooth or Wi-Fi.

In this case, the beacon device refers to a device such as a beacon or a lighthouse that periodically transmits a signal to transmit location information. In a narrow sense, the beacon device refers to a near field communication device for transmitting various information and data by using location recognition and communication technology based on IT technology. The beacon is operable with a small amount of packet transmission, does not require pairing of connecting two devices, and communicates with a low power, so that a location can be recognized at a lower cost in comparison with other near field communication technologies. The near field communication (NFC) allows for communicating only within a short distance of 20 cm or less in a contact manner, whereas the beacon supports communication at a long distance of maximum 50 m in a non-contact manner. In addition, a location of a device can be identified within an error range of 5 cm.

The beacon devices 101 to 109 are devices given to each user (child) who has completed user registration by matching a beacon management number (unique identifier) to user information (name, etc.). The beacon devices 101 to 109 may be prepared in a form of a wrist watch worn on a wrist of the user or may be prepared in a form of a necklace hung around a neck of the user, but embodiments are not limited thereto.

Therefore, one or more beacon devices may be arranged in a single play space 10, a beacon scanner 111 installed in the single play space 10 receives respective beacon signals from the beacon devices.

Meanwhile, at least one beacon scanner 111 to 119 is respectively disposed at each of the play spaces 10 to 90 to transmit entry data by scanning a beacon signal transmitted from each of the beacon devices 101 to 109 entering each of the play spaces and to transmit exit data by scanning a beacon signal transmitted from the beacon device exiting from each of the play space.

In other words, the at least one beacon scanner 111 to 119 transmits unique identifier of the beacon scanner corresponding to the play space which corresponds to a communication area of the beacon scanner, the entry data related to a time at which an entry beacon signal transmitted from the beacon device entering the play space is received, and the exit data related to a time at which an exit beacon signal transmitted from the beacon device exiting from the play space is received to the data collection and analysis device 120. In this case, in order to recognize the time at which the entry beacon signal is received and the time at which the exit beacon signal is received, the at least one beacon scanner 111 to 119 is provided with a timer function of counting a time. Therefore, the at least one beacon scanner 111 to 119 generates the entry data including the time at which the entry beacon signal is received, and generates the exit data including the time at which the exit beacon signal is received to transmit the generated entry data and the generated exit data to the data collection and analysis device 120.

In addition, the at least one beacon scanner 111 to 119 may be applied thereto with a remote management solution as shown in FIG. 2, and transmits a signal reception result received from each of the beacon devices 101 to 109 to the data collection and analysis device 120 together with device identification information of the beacon devices 101 to 109 through HTTP communication. In this case, the signal reception result includes the entry data and the entry data for each user.

Figure 17B:
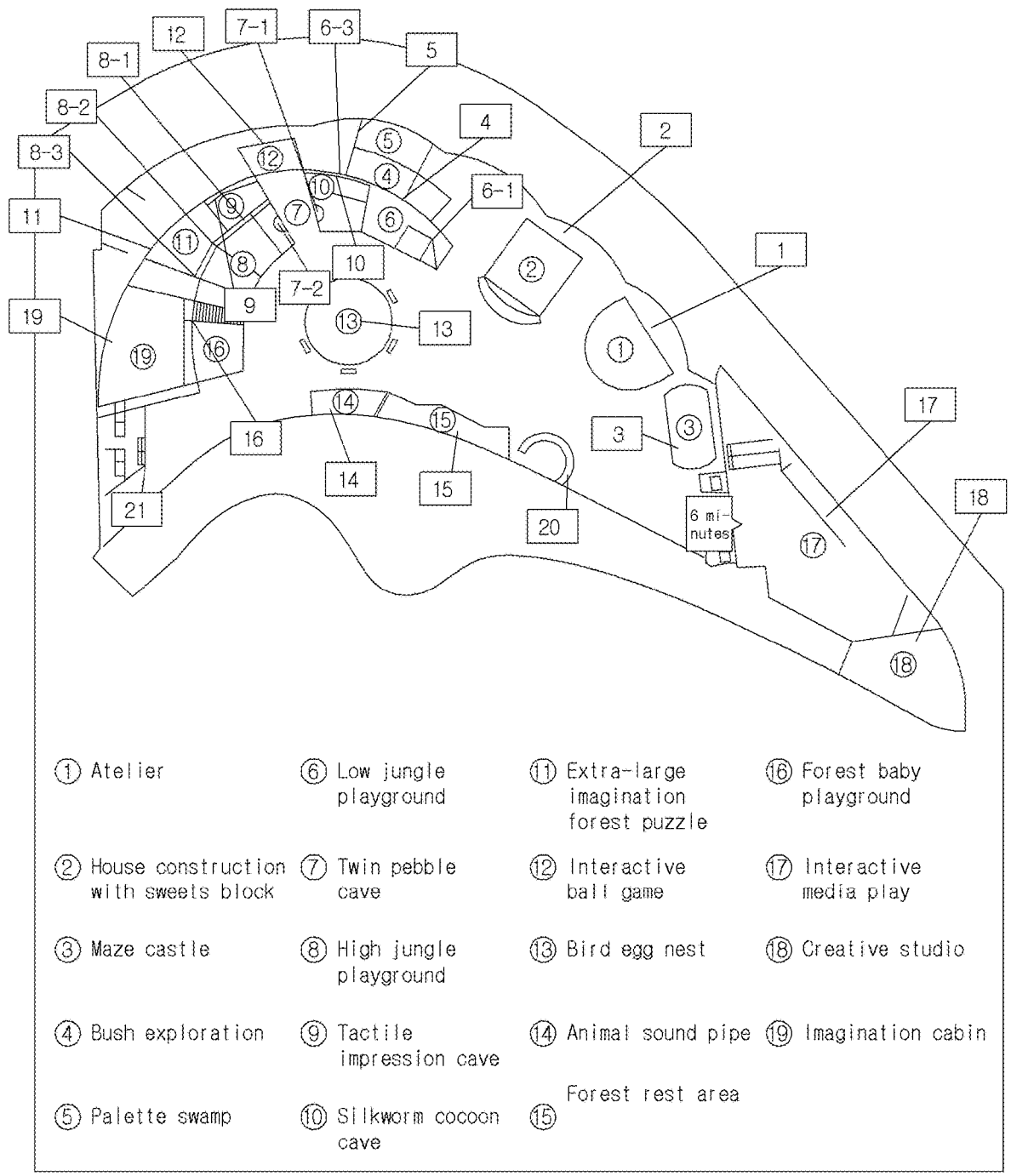
FIG. 17B is a view showing arrangement of a beacon scanner.

In addition, as shown in FIG. 3, a single beacon scanner may be installed in a single play space, or one or more beacon scanners may be installed in a single play space such as a forest jungle hill 10, a forest palette swamp 20, an imagination stump 30, a forest sweets house 40, a forest spring 50, a forest deep cave 60, a creative studio 70, an imagination cabin 80, and a design shop 90. For example, as shown in FIG. 17B, a single beacon scanner 1 is installed only in an atelier play space of the forest spring 50, whereas one or more beacon scanners 1 are installed for each of the play spaces in the forest jungle hill 10. In other words, three beacon scanners 6-1, 6-2, and 6-3 are installed in a low jungle playground, two beacon scanners 7-1 and 7-2 are installed in the twin pebble cave, three beacon scanners 8-1, 8-2, and 8-3 are installed in a high jungle playground, and a single beacon scanner is installed in a silkworm cocoon cave 10, a tactile impression cave 9, an extra-large imagination forest puzzle 11, and an interactive ball game 12, so that a total of 12 beacon scanners are installed.

Meanwhile, the data collection and analysis device 120 receives the entry data and the exit data for each user from the at least one beacon scanner 111 to 119, collects data for each user, generates user-based location tracking data by performing location positioning on each user based on the entry data and the exit data for each user, and generates a play pattern for each user by analyzing the generated user-based location tracking data.

In other words, the data collection and analysis device 120 is configured to recognize a playground name of the play space corresponding to the unique identifier of the beacon scanner, recognize the time at which the entry beacon signal is received in the play space through the entry data, recognize the time at which the exit beacon signal is received in the play space through the exit data, and calculate a play stay time in the play space by subtracting the time at which the entry beacon signal is received from the time at which the exit beacon signal is received for each user.

In addition, the data collection and analysis device 120 is configured to generate the user-based location tracking data according to a time sequence by arranging an entry time and an exit time of each of the play spaces for each user according to the time sequence, and correspondingly arranging the playground name of each of the play spaces according to the time sequence.

In addition, the data collection and analysis device 120 is configured to analyze the generated user-based location tracking data to generate a table representing a sensory play activity, design sensory play availability, a play type, a play activity property, and a play time which correspond to each of playground names, and the play pattern for each user including a play time map indicating the play time for each of play activities on a map, a distribution chart over the play type in which the play time for each date is expressed on a percentage basis according to the play type, a play time graph comparing the play time with a peer average play time, an occupancy level of a group activity space that indicates a play time occupancy rate for each of group activity spaces, and a design sensory play distribution chart representing the play time over a design element.

Meanwhile, the play report device 130 generates a comprehensive play report for each user based on the play pattern for each user according to a play report function shown in FIG. 2 to print out the generated comprehensive play report for each user on a report result sheet, in which the comprehensive play report includes a play facility-based interest level, a design sense level, a visit history, and an age-based comparison index.

In other words, the play report device 130 generates the comprehensive play report for each user as shown in FIGS. 4A to 4B and FIGS. 4C to 4G based on the play pattern for each user to print out the generated comprehensive play report for each user on the report result sheet. FIGS. 4A to 4B and FIGS. 4C to 4G are views showing an example of a comprehensive play report for each user printed out from a play report device according to the embodiment of the present invention. As shown in FIGS. 4A to 4B and FIGS. 4C to 4G, the comprehensive play report for each user includes a user name, a play date, age, gender, a number of visits, a most played activity (first/second/third), a play time in each of playground names, a total play time, a remaining time except for the play activity, an image showing the play time for each of play activities on a map, a time distribution chart for each play according to a past visit history, a graph comparing the play time of the user with a peer average play time over a play type, an occupancy level of a group activity space occupied by the user according to a space size, and a design sensory play distribution chart representing the play time over a design element.

In addition, the play report result sheet printed out by the play report device 130 is set based on a play type which is directly developed based on a preset educational goal as described above.

In other words, the educational goal of helping well-rounded growth and development of each child can be achieved through play activities in the play spaces constructed according to the sensitivity play program developed based on the kindergarten Nuri curriculum (social relations, art experiences, physical exercise and health, nature exploration, communication, etc.) and the career maturity test theory of Ministry of Education (Multiple Intelligence).

In addition, the play report device 130 is configured to generate the visit history for each user by classifying the user-based location tracking data or data about the comprehensive play report for each user by a date, store the generated visit history for each user in the play report DB 132, and allow the user (child) to inquire the history of the play activities in the play spaces 10 to 90 according to a history inquiry function as shown in FIG. 2.

In addition, the play report device 130 may check the system according to a system check function shown in FIG. 2 by monitoring status data of the beacon scanner and status data of the beacon device operated in each of the play spaces in real time.

In addition, the play report device 130 may generate a comprehensive play report for a group team to which a plurality of users (children) belong to perform group team output according to a group team output function shown in FIG. 2.

Meanwhile, the play report database (DB) 132 stores a name and an ID of each of the play spaces, unique identification information of the beacon scanner corresponding to each of the play spaces, an image of a play map on which the play spaces are disposed, the play pattern for each user, and the comprehensive play report for each user as data.

In addition, the play report database (DB) 132 is configured to store a playground name, a sensory play activity, design sensory play availability, a play type, and a play activity property correspondingly to each of the play spaces.

In addition, as shown in Table 1 below, the play report database (DB) 132 is configured to store the play time for each user calculated for each of the play spaces 10 to 90 by the data collection and analysis device 120 correspondingly to one or more play activities included in each of the playground names.

TABLE 1

| Playground name | Play activities | Play time (minutes) |
| --- | --- | --- |
| Spring (Zone1) | Atelier | 4 |
| Sweets house (Zone2) | House construction with sweets block | 18 |
| Palette swamp (Zone3) | Bush exploration | 2 |
| | Palette swamp | 1 |
| Jungle hill (Zone4) | Low jungle playground | 21 |
| | Twin pebble cave | 2 |
| | High jungle playground | 16 |
| | Tactile impression cave | 4 |
| | Extra-large imagination forest puzzle | 95 |
| | Interactive ball game | 1 |
| Stump (Zone5) | Bird egg nest | 29 |
| | Animal sound pipe | 14 |
| | Forest rest area | 23 |
| | Forest baby playground | 15 |
| Deep cave (Zone6) | Interactive media play | 6 |
| Total | | 251 |

TABLE 1-continued

| Playground name | Play activities | Play time (minutes) |
| --- | --- | --- |
| Free time | Movement and free activities | 21 |
| Special activities | Creative studio | 2 |
| | Imagination cabin | 18 |

In addition, the play report database (DB) 132 is configured to store a user name, a play date, age, gender, a number of visits, a most played activity, a play time in each of playground names, a total play time, a remaining time except for the play activity, an image showing a play time for each of play activities on a map, a time distribution chart for each play according to a past visit history, a graph comparing a play time of the user with a peer average play time over the play type, an occupancy level of a group activity space occupied by the user according to a space size, and a design element graph according to an occupancy rate of each of the play spaces, with respect to the comprehensive play report for each user.

Meanwhile, the management device 140 provides a web-based management program capable of monitoring and inquiring an operation status of equipment arranged in each of the play spaces in real time, manages a usage status for each user registered through the user registration device, manages a facility of each of the play spaces with data, manages evaluation data according to the comprehensive play report for each of individuals, and manages a statistics status based on the evaluation data.

In other words, the management device 140 may monitor the beacon scanner for each of the play spaces to manage a monitoring result as data according to a monitoring function shown in FIG. 2.

In addition, the management device 140 may manage an overall usage status for the play spaces, a status for each of play activities, and a user status according to a user management function shown in FIG. 2.

In addition, the management device 140 may manage states of the at least one beacon scanner and the at least one beacon device as data according to a facility management function shown in FIG. 2, and manage an evaluation index, the play activity, and a measurement index according to the comprehensive play report for each user according to an evaluation management function.

In addition, the management device 140 may manage visitor statistics, usage time zone statistics, revisitation rate statistics, statistics for each of measurement indexes, statistics for each of play times, and peer average statistics according to a statistics management function shown in FIG. 2.

Meanwhile, according to the embodiment of the present invention, the play activities (atelier, palette swamp, tactile impression cave, etc.) and the play report result sheet reflecting the play time and the analysis result according to the play activities can be continuously updated and customized. In other words, in a case where play activities are changed or newly designed corresponding to a location and a space of the playground name which are changed or newly defined, information correspondingly changed or newly added is stored in the play report DB 132, so that the beacon scanners 111 to 119 installed in the changed or newly added play spaces, the data collection and analysis device 120, and the play report device 130 are operated by reflecting the updated information based on the play report DB 132 modified as described above.

For example, the embodiment of the present invention is implemented with a design playground concept to include a measurement item for 'design sense'. However, when the play space is changed by applying a body playground concept thereto, update can be performed by adding measurement items for 'body sensation'.

Figure 5:
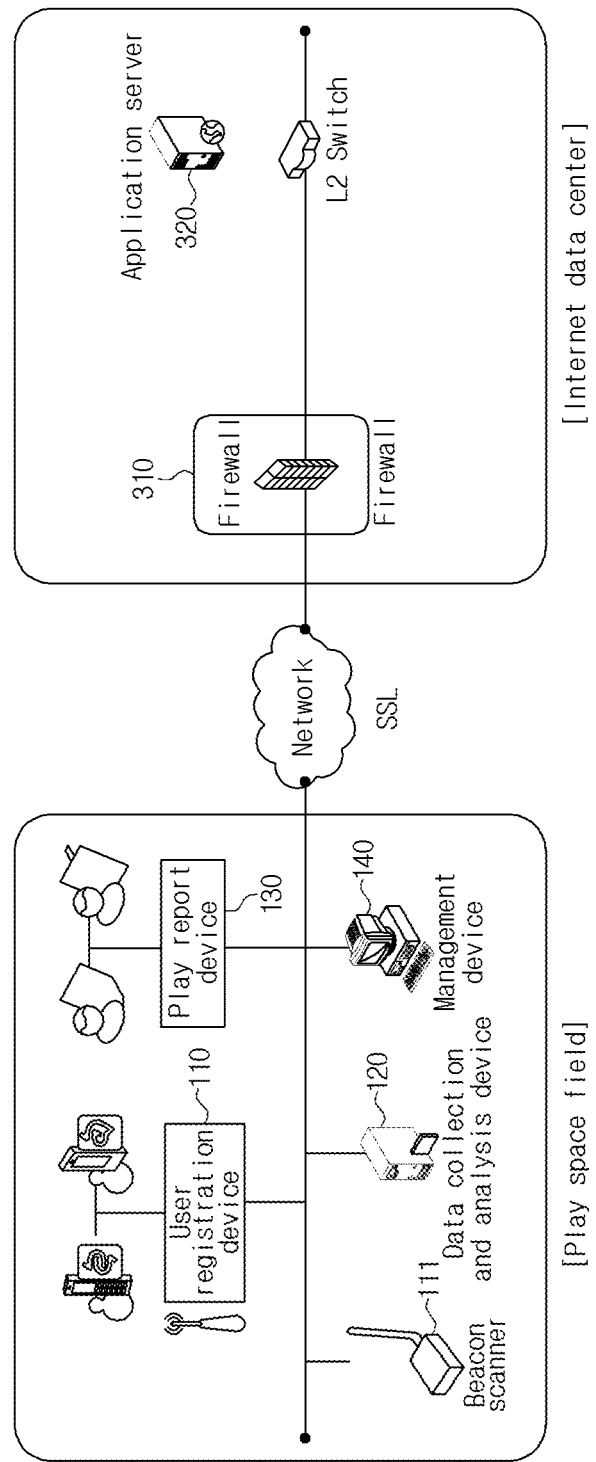
FIG. 5 is a view showing an example in which the play activity tracking system is operated by leasing an Internet data center according to the embodiment of the present invention.

FIG. 5 is a view showing an example in which the play activity tracking system is operated by leasing an Internet data center according to the embodiment of the present invention.

As shown in FIG. 5, the play activity tracking system 100 according to the embodiment of the present invention is operated by leasing a separate Internet data center to ensure an additional separate space for physical and technical measures.

In this case, the Internet data center is connected to the play activity tracking system 100 according to the present invention through a secure sockets layer (SSL), and may be connected with an application (App) server 320 through a firewall 310 and an L2 switch.

In this case, the SSL is an Internet communication protocol for securely transmitting data on the Internet, and has been developed to overcome the problem that an Internet protocol may not maintain confidentiality in terms of security. The SSL is the most generally used protocol to maintain the security of personal information required in Internet commerce.

Figure 6:
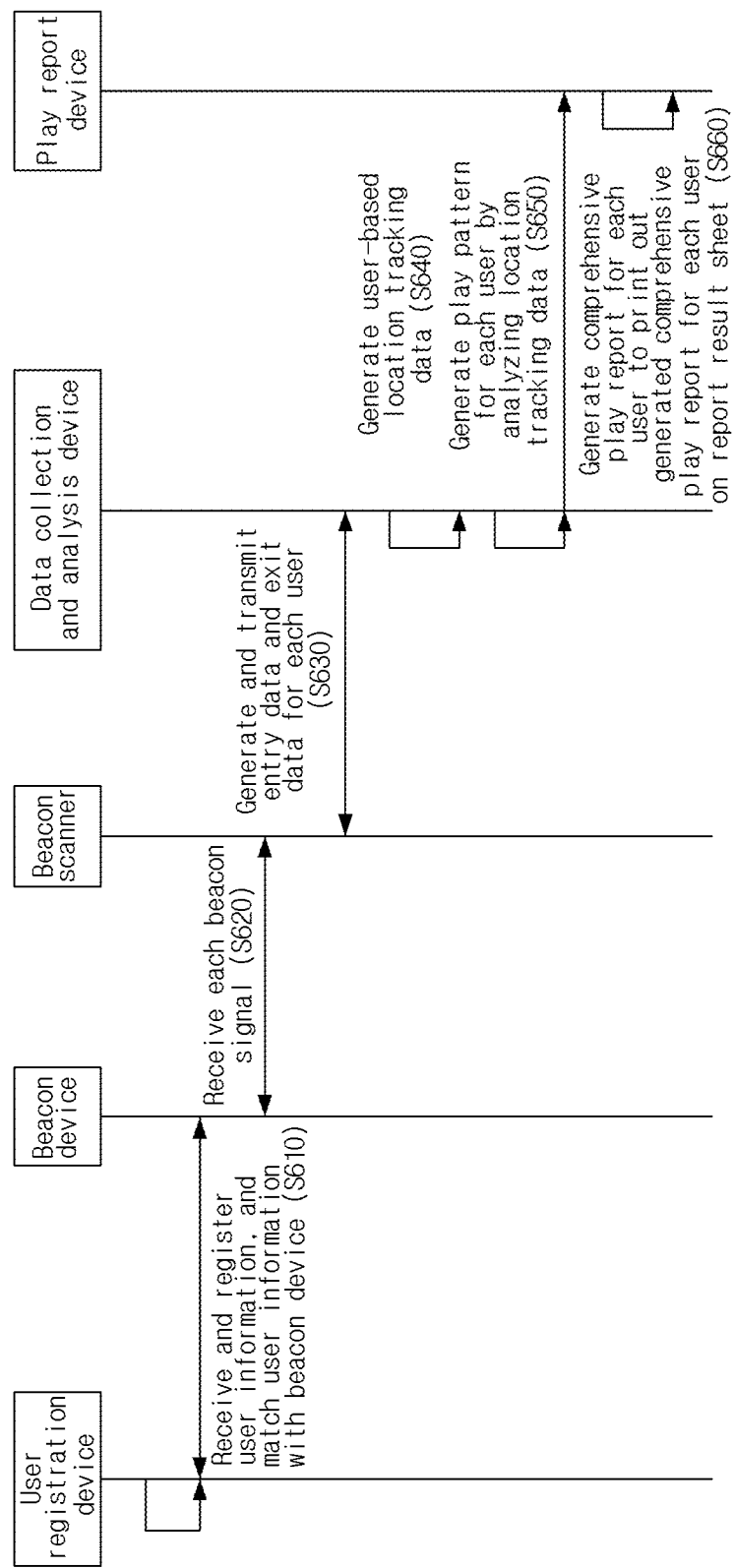
FIG. 6 is a view showing an overall flowchart for explaining a play activity tracking method according to an embodiment of the present invention.
Figure 9C:
Figure 9D:
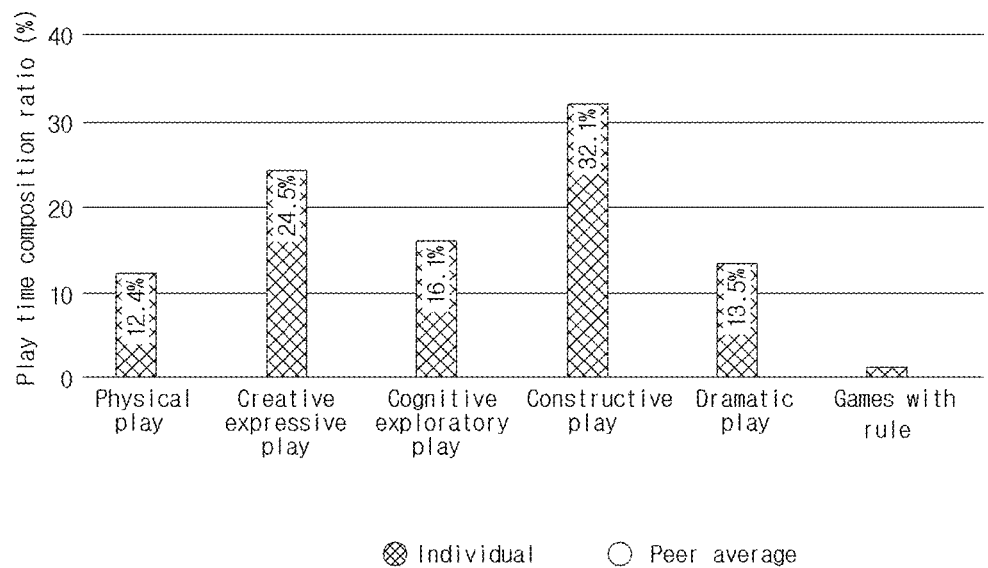
Figure 9E:
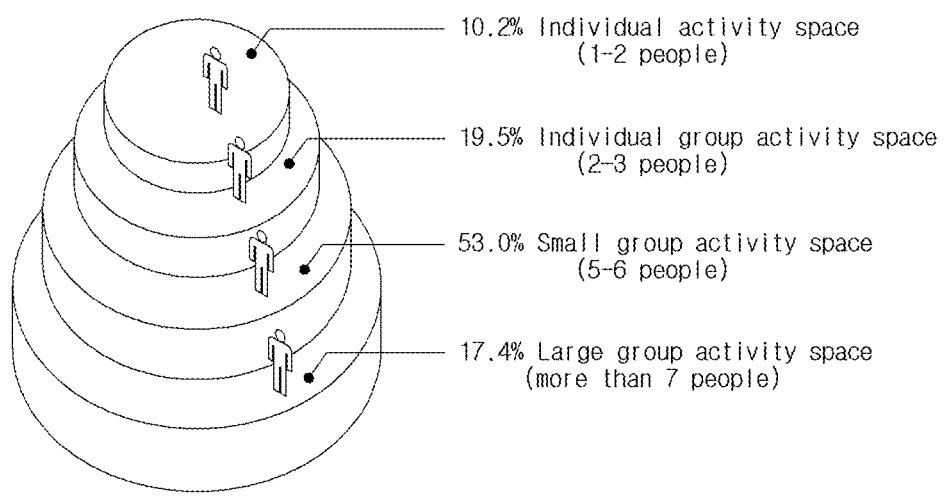
Figure 9F:
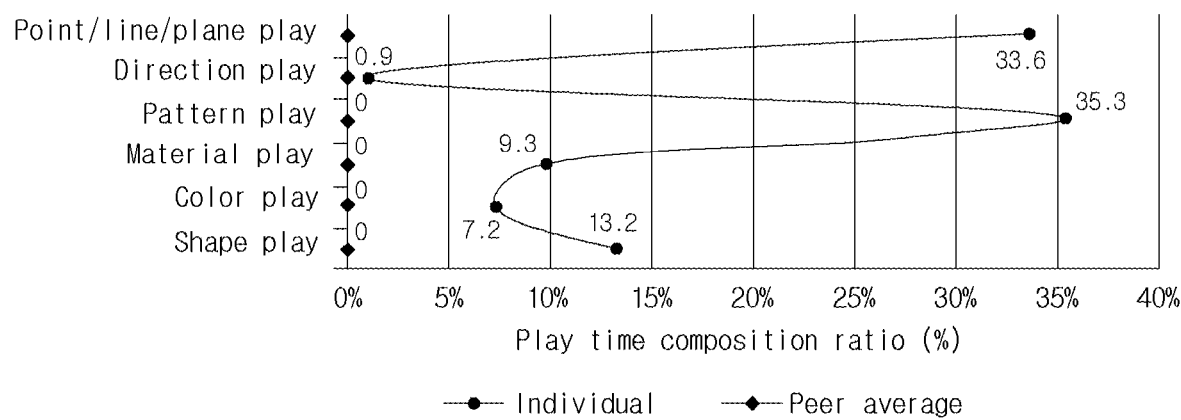
Figure 10A:
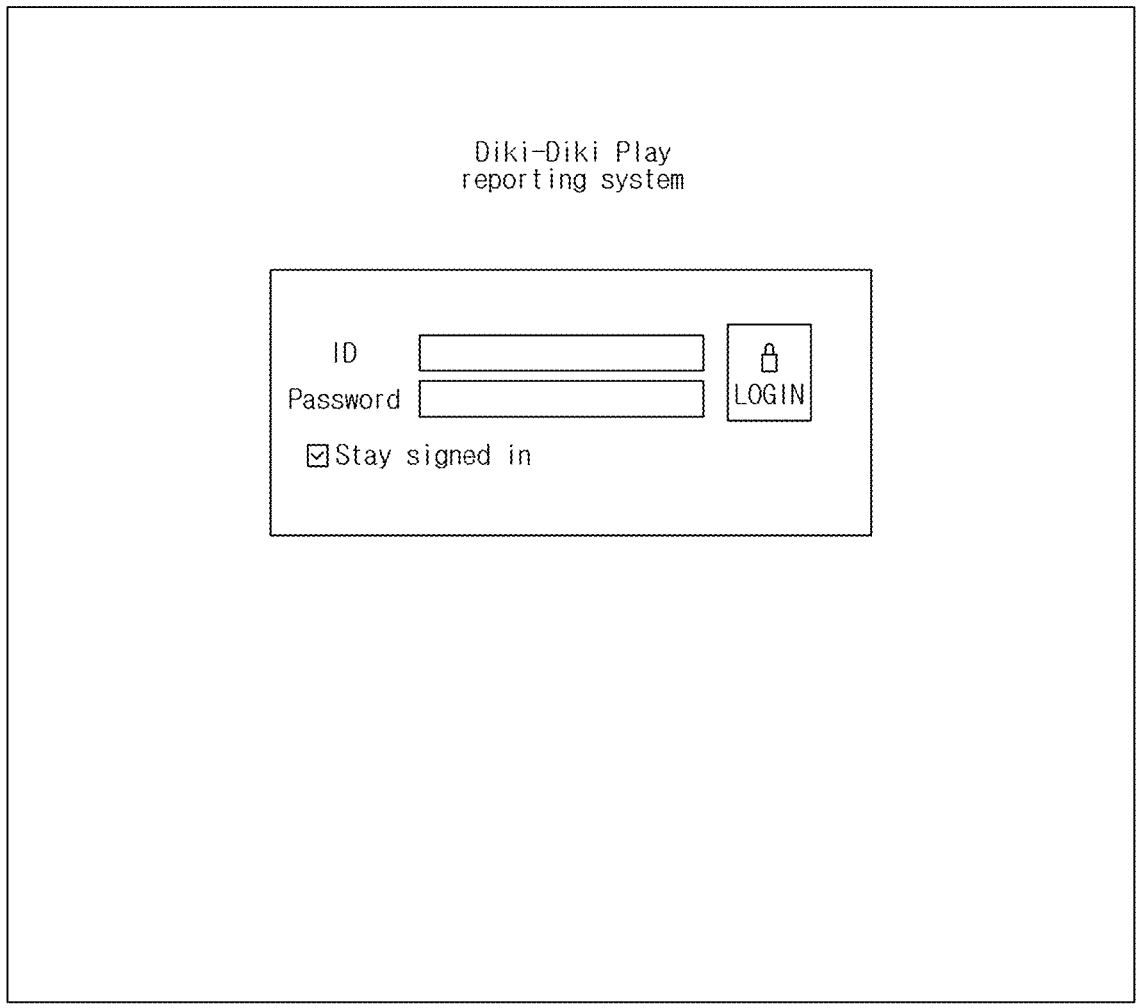
Figure 10B:
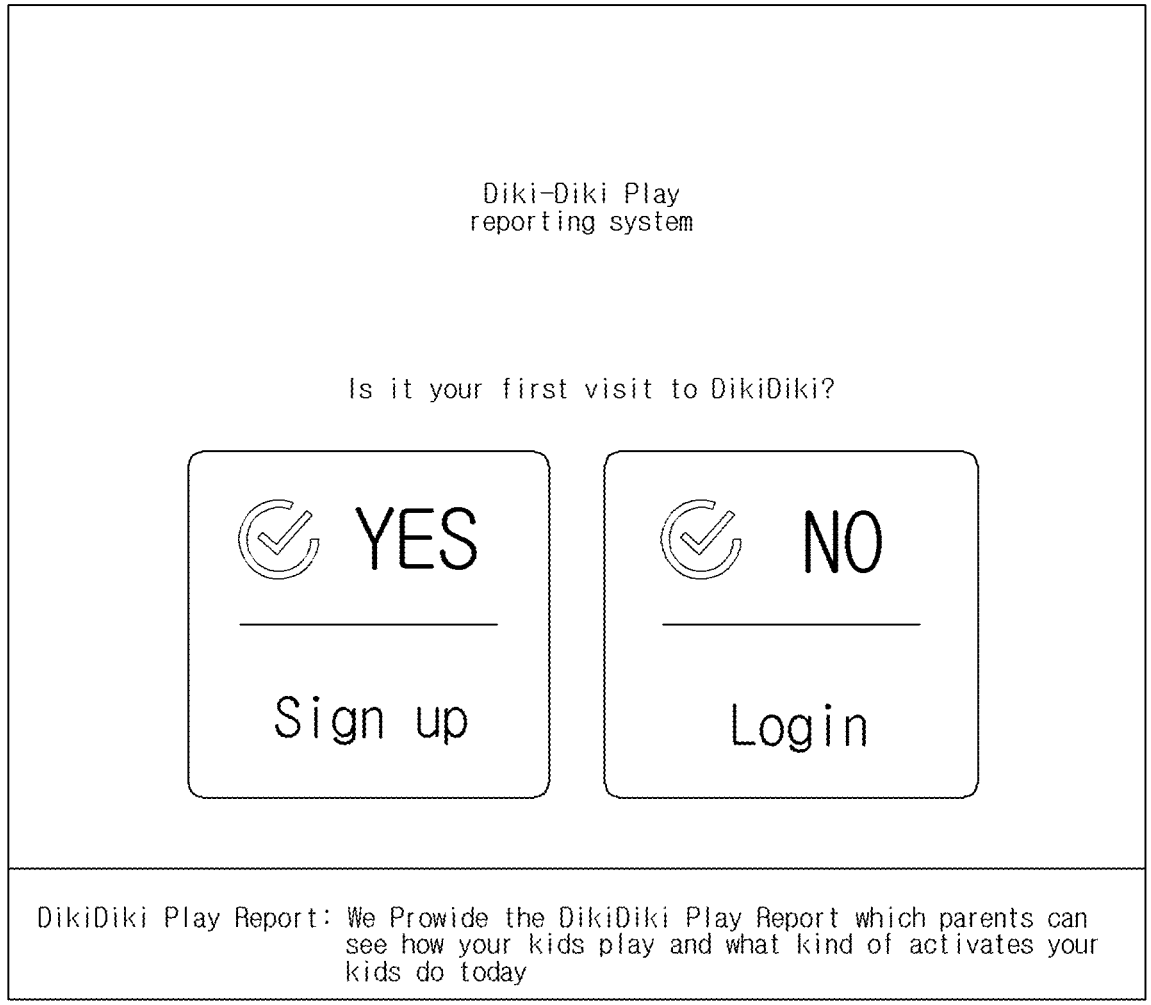

FIG. 6 is a view showing an overall flowchart for explaining a play activity tracking method according to an embodiment of the present invention.

As shown in FIGS. 1 to 6, in the play activity tracking system 100 according to the embodiment of the present invention, the user registration device 110 registers the user by receiving user information, and matches a single beacon device with the received user information (S610).

In other words, the user registration device 110 receives the user information including the user name, age, gender, parent name, and contact number by a manager, and stores the user information in the play report database 132 to register the user. In this case, when receiving the user information, the user registration device 110 assigns an access code (e.g., R170900273) to the user (child) as a unique identifier, and stores the access code and the user information in the play report DB 132 by matching the access code to the user information.

In addition, the user registration device 110 performs the matching by storing a beacon management number of the beacon device matched with the user information in the play report database 132 correspondingly to the user information.

In this case, the manger may put the beacon device 101 matched with the user information to a wrist of the user (child) or may hang the beacon device 101 around a neck of the user (child), and the user (child) is guided to perform play activities in each of the play spaces 10 to 90. For example, a case where an 8-year-old male child "Hwang" completes his user registration and walks around each of the play spaces to perform play activities will be illustrated as follows.

Accordingly, the user (child) repeatedly performs an operation of entering each of the play spaces or exiting each of the play spaces while wearing the beacon device 101 each time the play activity is started or completed. For example, Hwang enters a low jungle playground A-1 within the play space of the forest jungle hill 10 at 10:00 AM on Sunday, Sep. 24, 2017, performs the play activity for 21 minutes, and exits the low jungle playground A-1 to move to the twin pebble cave.

In this case, the beacon scanners 111 to 119 installed in each of the play spaces 10 to 90 receive beacon signals from the beacon devices 101 to 109 when the user (child) enters or exits the play spaces 10 to 90.

Therefore, the beacon scanner 111 installed in the low jungle playground A-1 receives the beacon signal from the beacon device 101 worn by the user (child) at a time when the user (child) enters the low jungle playground A-1 or at a time when user (child) exits the low jungle playground A-1 (S620).

In other words, the beacon scanner 111 receives an entry beacon signal transmitted when the beacon device 101 enters the play space 10 which corresponds to a communication area of the beacon scanner 111 for the first time, receives a general beacon signal from the beacon device 101 in the play space at a predetermined time interval during the play activity after entering the play space, and receives an exit beacon signal transmitted when the beacon device 101 exits the play space.

In the embodiment of the present invention, although the beacon signals transmitted from the beacons devices 101 to 109 are general beacon signals including the identifier information, the beacon signal received from the beacon device at the time when the beacon device enters each of the play spaces for the first time is referred to as "entry beacon signal", and the beacon signal received lastly in the play space because the beacon signal is no longer received in the play space when the beacon devices exits the play space is referred to as "exit beacon signal", such that the beacon signals can be distinguished from general beacon signals for convenience of explanation.

Then, the beacon scanner 111 generates entry data and exit data for each user with respect to the play space as shown in FIG. 7 based on the beacon signal received as described above, and transmits the generated entry data and the generated exit data for each user to the data collection and analysis device 120 (S630).

In other words, as shown in FIG. 7, the beacon scanner 111 may transmit its own unique scanner identifier (Scanner ID) corresponding to the play space A-1 corresponding to the communication area of the beacon scanner 111, the entry data related to the time at which the entry beacon signal is received, and the exit data related to the time at which the exit beacon signal is received to the data collection and analysis device 120. FIG. 7 is a view showing transmission formats of entry data and exit data for each user with respect to each of play spaces, which are transmitted from a beacon scanner according to the embodiment of the present invention. In FIG. 7, the scanner identifier recognizes the playground name of the play space corresponding thereto, a beacon identifier recognizes the user (child) who performs activities in the play space, and recognizes the entry time and the exit time for the play space through a reception time.

Next, the data collection and analysis device 120 generates user-based location tracking data based on the received entry data and the received exit data for each user (S640).

In other words, the data collection and analysis device 120 recognizes a playground name (low jungle playground A-1) of the play space 10 corresponding to a unique identifier of the beacon scanner 111, recognizes the time at which the user enters the play space through the entry data and the time at which the user exits the play space through the exit data, and calculates a play stay time in the play space by subtracting the time at which the entry beacon signal is received from the time at which the exit beacon signal is received. In addition, the data collection and analysis device 120 generates the user-based location tracking data in which the user has performed the play activities while walking around the play spaces according to a time sequence by arranging the entry time and the exit time of each of the play spaces for each user according to the time sequence as shown in FIG. 8, and correspondingly arranging the playground name of each of the play spaces according to the time sequence. FIG. 8 is a view showing an example of generating user-based location tracking data by a data collection and analysis device according to the embodiment of the present invention. As shown in FIG. 8, it is found from the location tracking data that the user (child) spent 8 minutes in a spring play space, 18 minutes in a sweets house play space, 3 minutes in the palette swamp, 139 minutes in a jungle hill play space, and 81 minutes in the stump. In addition, it is found that the user (child) spent 6 minutes in a deep cave play space, 2 minutes in the creative studio, and 18 minutes in the imagination cabin.

In addition, with respect to the play activity of each of the play spaces, the data collection and analysis device 120 classifies the play spaces into an individual activity space where 1 to 2 people can perform activities, an individual group activity space where 2 to 3 people can perform activities, a small group activity space where 5 to 6 people can perform activities, and a large group activity space where more than 7 people can perform activities based on a size of a group activity space, and converts the play time in the corresponding space into a percentage so as to generate Play pattern 4 shown in FIGS. 9A to 9F.

In addition, the data collection and analysis device 120 classifies the atelier in the spring, the house construction with the sweets block and the interactive maze table in the sweets house, the bush exploration and the palette swamp in the palette swamp, the tactile impression cave, the silkworm cocoon cave, the extra-large imagination forest puzzle, and the interactive ball game in the jungle hill, the bird egg nest and the animal sound pipe in the stump, and the interactive media play in the deep cave, which correspond to a design sensory play in sensory play activities, into a point/line/plane play, a direction play, a pattern play, a material play, a color play, and a shape play, and converts the play time for each of the play activities into a percentage so as to generate Play pattern 5 shown in FIGS. 9A to 9F.

In this case, the data collection and analysis device 120 accumulates the number of users for each of the play spaces based on the data collected for each of the play spaces 10 to 90 by a date, a time zone, a day, a week, a month, a year or the like to generate statistical data, and stores the generated statistical data in the play report DB 132. The statistical data stored in the play report DB 132 is used when searching for statistical data or usage record data.

In addition, the data collection and analysis device 120 generates user-based real-time usage status data and group-based real-time usage status data based on the data collected for each of the play spaces 10 to 90 to store the generated data in the play report DB 132.

In this case, when the data collection and analysis device 120 calculates a physical play ratio, a creative expressive play ratio, a cognitive exploratory play ratio, a constructive play ratio, a dramatic play ratio, and games with rules ratio as shown in FIGS. 9A to 9F by applying the play time for each of the play activities to the play time of the user (child) spent in all the play spaces, which is 251 minutes in total as shown in FIG. 8. For example, in a case where the playground name is 'jungle hill' and the play activity is a 'extra-large imagination forest puzzle', the play time is 95 minutes, so that the data collection and analysis device 120 calculates the percentage of 95 minutes to 251 minutes, which is 37.8%. However, since the play type corresponds to a creative expressive play and a constructive play, the creative expressive play is calculated as 24.5% and the constructive play is calculated as 32.1% by applying a share according to characteristics of each play type.

Then, the data collection and analysis device 120 generates a play pattern for each user by analyzing the generated user-based location tracking data, and transmits the generated play pattern to the play report device 130 (S650).

In this case, the play report DB 132 stores a playground name, a sensory play activity, design sensory play availability, a play type, and a play activity property correspondingly to each of the play spaces as data.

In addition, the play report DB 132 stores data on a play type applied as each play activity corresponding to each playground name among a physical play, a creative expressive play, a cognitive exploratory play, a constructive play, a dramatic play, and games with rules.

Therefore, the data collection and analysis device 120 analyzes the user-based location tracking data based on the data stored in the play report DB 132 to generate a table (Play pattern 1) representing a sensory play activity, design sensory play availability, a play type, a play activity property, and a play time which correspond to each of playground names as shown in FIGS. 9A to 9F, or to generate the play pattern for each user including a play time map (Play pattern 2) indicating the play time for each of play activities on a map, a distribution chart over the play type in which the play time for each date is expressed on a percentage basis according to the play type, a play time graph (Play pattern 3) comparing the play time with a peer average play time, an occupancy level of a group activity space (Play pattern 4) that indicates a play time occupancy rate for each of group activity spaces, and a design sensory play distribution chart (Play pattern 5) representing the play time over a design element as shown in FIGS. 9A to 9F. FIGS. 9A to 9F are views showing a play pattern for each user which is generated by analyzing the user-based location tracking data by the data collection and analysis device according to the embodiment of the present invention.

Next, the play report device 130 generates a comprehensive play report for each user based on the play pattern for each user as shown in FIGS. 9A to 9F to print out the generated comprehensive play report for each user on a report result sheet (S660).

Figure 4C:
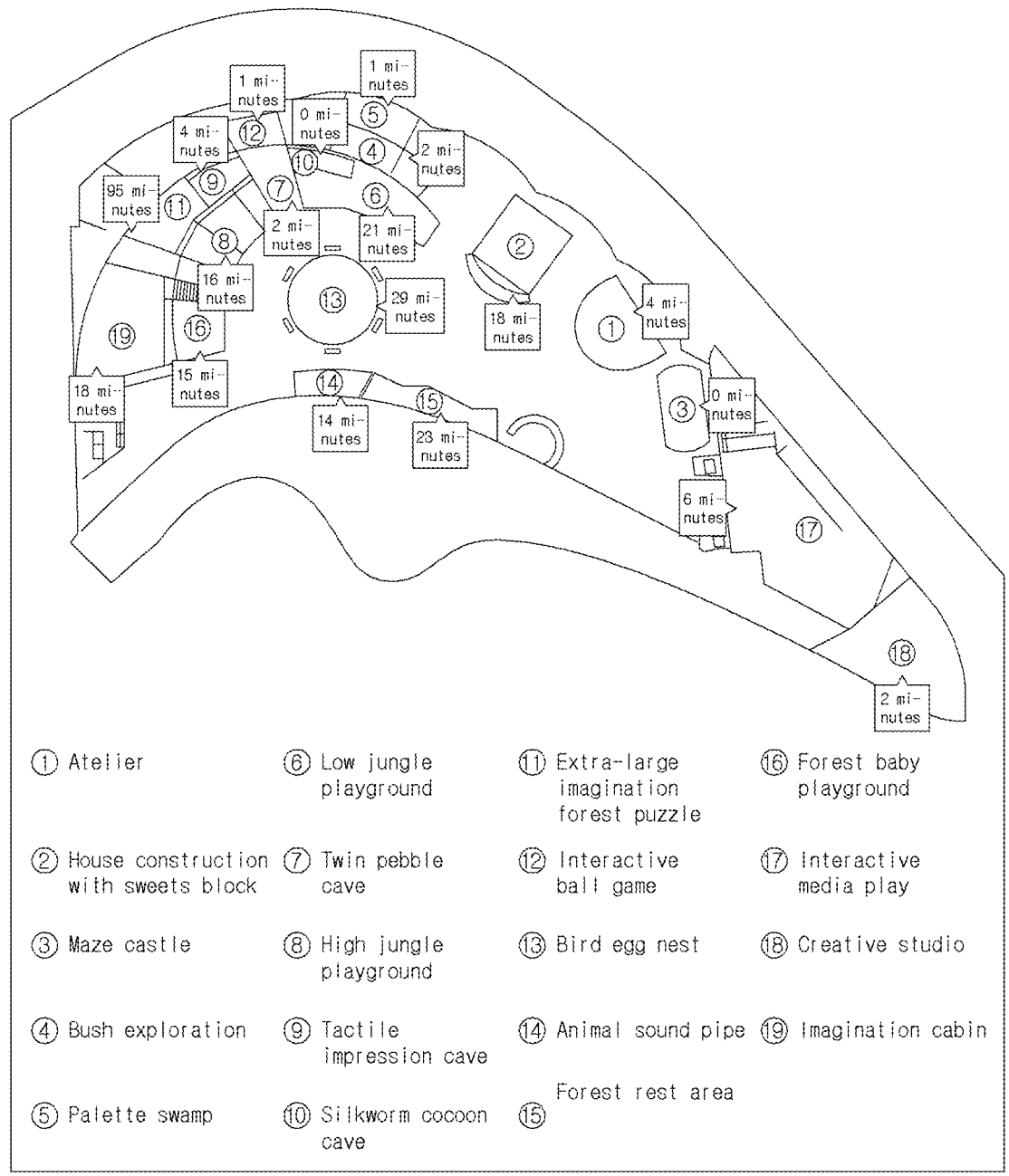
Figure 4D:
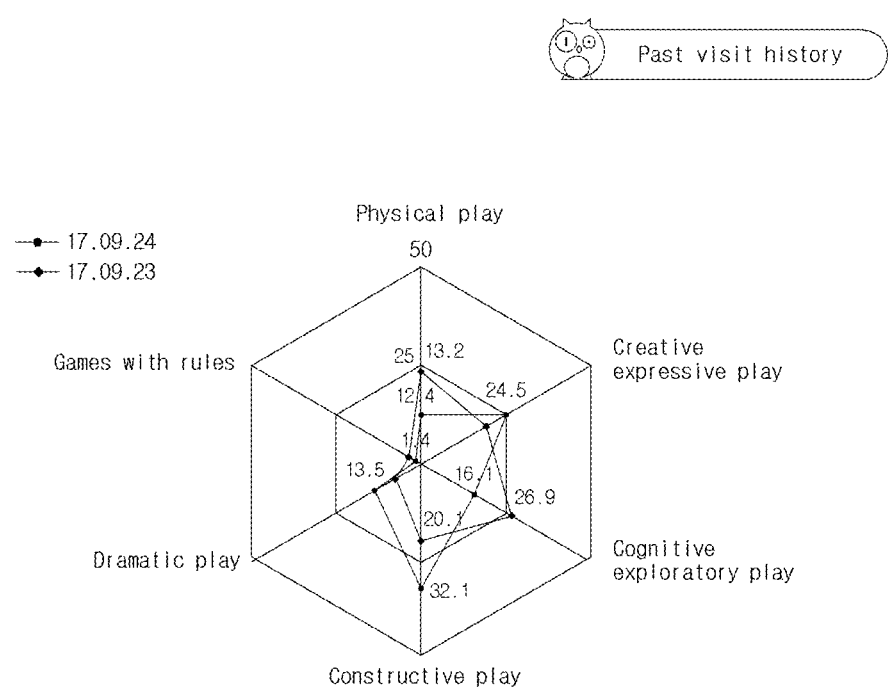
Figure 4E:
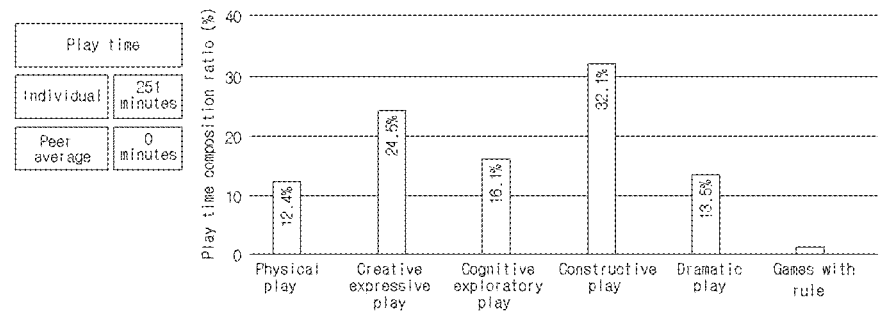

In other words, the play report device 130 generates a comprehensive play report for each user as shown in FIGS. 4A to 4B based on the play pattern for each user as shown in FIGS. 9A to 9F, that is, a comprehensive play report for each user, which displays a user name, a play date, age, gender, a number of visits, a most played activity, a play time in each of playground names, a total play time, a remaining time except for the play activity and includes an image showing the play time for each of play activities on a map, a time distribution chart for each play according to a past visit history, a graph comparing the play time of the user with a peer average play time over a play type, an occupancy level of a group activity space occupied by the user according to a space size, and a design sensory play distribution chart representing the play time over a design element as shown in FIGS. 4C to 4G to print out the generated comprehensive play report for each user on a report result sheet.

In this case, the play report device 130 provides the most played activity up to a third activity (TOP 3) according to an order of the play time by sequentially arranging the activities in the order of the play time in each of the play spaces. For example, as shown in FIGS. 4A to 4B, a first activity (TOP 1) having a largest play time of 95 minutes, which is the extra-large imagination forest puzzle, a second activity (TOP 2) having a second largest play time of 29 minutes, which is the bird egg nest, and the third activity (TOP 3) having a third largest play time of 23 minutes, which is the forest rest area, are provided as the activities played the most number of times today.

FIGS. 10A to 10D are views showing a screen for registering a user by receiving user information by a user registration device according to the embodiment of the present invention.

Referring to FIGS. 10A to 10D, the user registration device 110 according to the present invention may receive user information by selecting a new visitor or a return visitor through a separate POS terminal at a main gate.

In FIGS. 10A to 10D, in a case of new registration, the user registration device 110 may receive a name of the user (child), date of birth (first six digits of resident registration number), gender, nationality, a parent name, relationship, a contact number, a beacon management number, privacy policy agreement, etc.

In a case of revisitation registration, the user registration device 110 may receive the name of the user (child), date of birth (first six digits of resident registration number), gender, the parent name, relationship, the contact number, the beacon management number, etc.

The user registration device 110 completes the user registration by storing the received user information as shown in FIGS. 10A to 10D in the play report DB 132.

FIG. 11 is a view showing a screen for managing an individual user in the play activity tracking system according to the embodiment of the present invention.

The play activity tracking system 100 according to the present invention manages an individual user through the user registration device 110 and the management device 140.

In other words, as shown in FIG. 11, the user registration device 110 provides a list of individual users currently using the facilities on a screen, and may add an individual user through a button 1 displaying 'add user'.

In FIG. 11, a user list 2 includes a name of the individual user, local/foreigner classification, gender, age, parent name, a contact number, a number of visits, a final visit date, and management buttons.

In addition, the play activity tracking system 100 may provide a function of sorting items of the user list in ascending or descending order of a final issue date.

In addition, the play activity tracking system 100 moves on to an individual user detailed information screen when an item 3 of the list is clicked, and the list provides information such as a name of the individual user, classification, gender, age, the parent name, a parent contact number, the number of visits, and the last visit date.

In addition, the play activity tracking system 100 may register a beacon when a management button 4 is clicked, or may perform modification of information, deletion of the information, etc.

In addition, the play activity tracking system 100 may add a group user through a group user management screen. When items such as an ID of the user, a name, gender, date of birth, nationality, a parent name, a contact number, an e-mail, relationship, an institution name, a contact number, and remarks are inputted and a submit button is clicked, the items are saved and the play activity tracking system 100 moves on to a list screen. Of course, information of the group user can be modified.

In addition, the play activity tracking system 100 may register beacon information correspondingly to a user currently using the facilities through a beacon registration button 5. In other words, when a management number recorded in the beacon is inputted and the submit button is pressed, the beacon information is inputted, and when the beacon is already registered, a beacon return button is activated.

Figure 12:
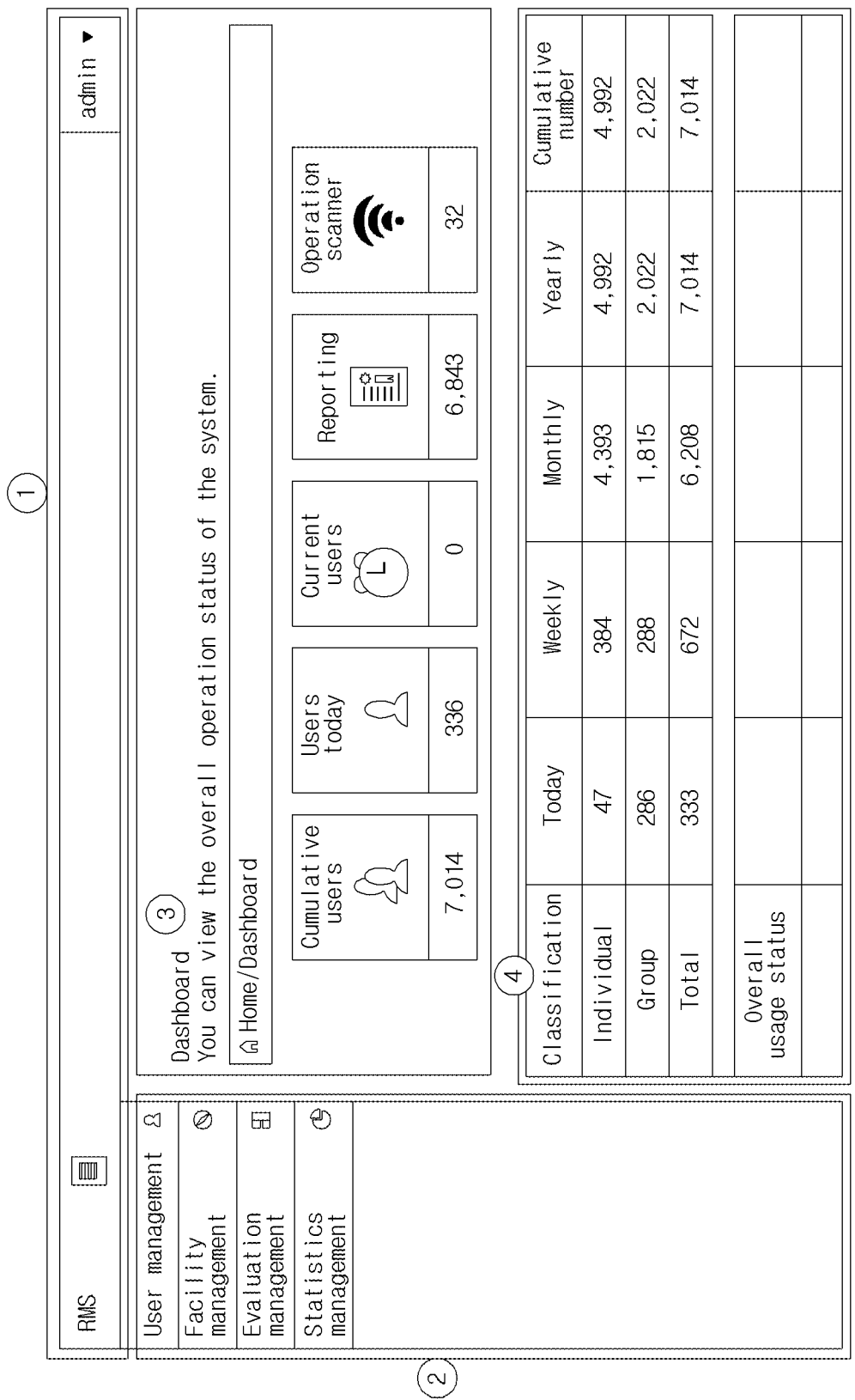
FIG. 12 is a view showing a screen for providing comprehensive statistics in the play activity tracking system according to the embodiment of the present invention.

FIG. 12 is a view showing a screen for providing comprehensive statistics in the play activity tracking system according to the embodiment of the present invention.

Referring to FIG. 12, the play activity tracking system 100 according to the present invention displays a top header 1 throughout the system on the main screen, and displays a [Home] button and a [Logout] button to return to the main screen (2).

In addition, the play activity tracking system 100 has a navigation menu 3 on a left side of the screen to allow access to various management screens, and provides data such as cumulative users, users today, current users, cumulative reporting, and a number of operational scanners through a user status 4.

In addition, the play activity tracking system 100 provides current overall statistics and statuses for each of individual or group visitors through a visitor statistics table, and may provide statistical data classified into today, weekly, monthly, yearly, cumulative, etc.

Figure 13:
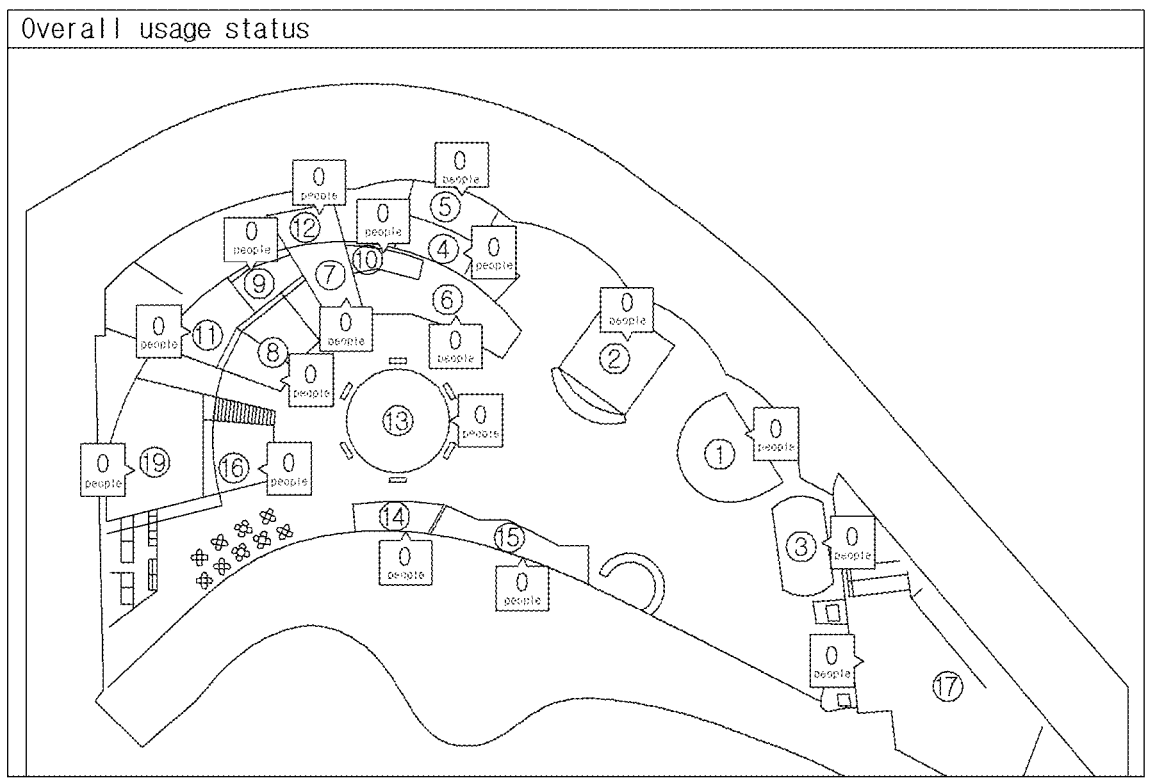
FIG. 13 is a view showing a screen for providing an overall usage status in the form of a map in the play activity tracking system according to the embodiment of the present invention.

FIG. 13 is a view showing a screen for providing an overall usage status in the form of a map in the play activity tracking system according to the embodiment of the present invention.

As shown in FIG. 13, the play activity tracking system 100 according to the present invention may provide a real-time usage map for displaying a number of people currently using a certain point of facilities to current users in an easily recognizable manner.

In other words, the play activity tracking system 100 displays a current user number on the map based on the statistical data collected from the user-based location tracking data generated based on the beacon data received from the beacon scanners 111 to 119 of each of the play spaces by the data collection and analysis device 120 as described above.

In addition, the play activity tracking system 100 may update the information once every predetermined time, for example, every 10 seconds to provide a detailed description and a current usage status for the point when the manager scrolls to a bottom.

FIG. 14 is a view showing user details on a user management screen of the play activity tracking system according to the embodiment of the present invention.

Referring to FIG. 14, the play activity tracking system 100 according to the present invention may provide individual user information (name, management number, age, gender, initial registration date, parent, relationship with parent, parent contact number, etc.) through an individual user details menu (1).

In addition, the play activity tracking system 100 provides a list of the visit history through a bottom list in an individual user details screen, and may check the status of using the facilities by the individual user through a visit status list (2). In other words, information such as a visit date, a stay time, an entering time, an exiting time, service provision and usage agreement, personal information privacy policy agreement, location information usage agreement, a beacon management number, and a report number of a visit status may be checked.

In addition, the play activity tracking system 100 may recognize a current location of the user (child) through the user management screen, and may allow a parent of the user (child) to recognize the current location of the user (child) through a mobile terminal carried by the parent. For example, as shown in FIGS. 9A to 9F, it is possible to display the current location of the child in the play time map (Play pattern 2) indicating the play time for each of play activities on a map.

In addition, the play activity tracking system 100 allows the user to view a usage status record sheet of the user through a record sheet button, and to output a result sheet through a result sheet button (3).

In addition, the play activity tracking system 100 moves on from a details screen to an individual user list screen through a list button 4 so that a usage list can be browsed.

FIG. 15 is a view showing a screen for managing play facilities in the play activity tracking system according to the embodiment of the present invention.

The play activity tracking system 100 according to the present invention may manage play facilities, for example, by providing a screen for managing the play facilities as shown in FIG. 15 through the management device 140.

In FIG. 15, the play activity tracking system 100 may move on to a screen for inputting new information of the play facilities through an add play facility button 1.

In addition, the play activity tracking system 100 may provide a function of sorting the play facilities in ascending or descending order of a play zone, a facility name, an operation state, and a registration date through a list header 2.

In addition, the play activity tracking system 100 may provide information such as the play zone, the facility name, the operation state, and the registration date of the play facility through a play facility list 3.

In addition, the play activity tracking system 100 may move on to information modification and information deletion through a management button 4.

In addition, the play activity tracking system 100 may change the operation state of the facility by clicking an operation state button 5.

In addition, the play activity tracking system 100 may input and add items, or may modify items such as an ID, the play zone, the facility name, a scanner, and remarks for a new play facility through a play facility addition screen in addition to the above-described functions.

FIG. 16 is a view showing a screen for managing a beacon device in the play activity tracking system according to the embodiment of the present invention.

For example, the play activity tracking system 100 according to the present invention may manage each of the beacon devices by providing a screen for managing the beacon device as shown in FIG. 16 through the management device 140.

In FIG. 16, when a beacon addition button 1 is clicked, the play activity tracking system 100 moves on to a screen for inputting new information of the beacon device to register a new beacon device.

In addition, the play activity tracking system 100 may provide a list header 2 with a function of sorting items in ascending or descending order of a beacon management number, beacon information, a battery, a use state, and a registration date.

In addition, the play activity tracking system 100 may provide information such as the beacon management number, the beacon information, the battery, the use state, and the registration date through a beacon list 3.

In addition, the play activity tracking system 100 may move on to information modification and information deletion when a management button 4 is clicked.

In addition, the play activity tracking system 100 may change the use state of the beacon by clicking a use state button 5.

In addition, the play activity tracking system 100 may provide a function of adding or modifying the beacon device in addition to the above-described functions. Upon the modification, items such as an ID, a nickname, UUID, MAC, Major, Minor, a management number, and remarks are inputted and executed.

FIG. 17A is a view showing a screen for managing a beacon scanner in the play activity tracking system according to the embodiment of the present invention, and FIG. 17B is a view showing arrangement of a beacon scanner.

For example, the play activity tracking system 100 according to the present invention may manage each of the beacon scanners by providing a screen for managing the beacon scanner as shown in FIG. 17A through the management device 140.

In FIG. 17A, the play activity tracking system 100 moves on from the screen for managing the beacon scanner to a screen for inputting new information of a scanner when an add scanner button 1 is clicked to add and register a new scanner.

In addition, the play activity tracking system 100 may provide a function of sorting items in ascending or descending order of a scanner number, classification, a nickname, a use state, and a registration date through a list header 2.

In addition, the play activity tracking system 100 may provide information such as the scanner number, the classification, the nickname, the use state, and the registration date in a scanner list 3.

In addition, the play activity tracking system 100 may move on to information modification and information deletion when a management button 4 is clicked.

In addition, the play activity tracking system 100 may change the use state of the scanner by clicking a use state button 5.

In addition, the play activity tracking system 100 may add or modify a scanner in addition to the above-described functions. Upon the addition or the modification, items such as an ID, a nickname, BLE AMC, Wi-Fi MAC, RSSI, classification, description, and remarks are inputted and executed.

In addition, the play activity tracking system 100 may set an RSSI (scanning sensitivity) value of the scanner, in which an RSSI setting range may be set from −30 to −100. The value is immediately applied by pressing a modify button after changing the value.

In addition, the play activity tracking system 100 arranges the beacon scanner in each of the play spaces as shown in FIG. 17B whenever the beacon scanner is added as described above, in which the play space where each of the beacon scanner is located can be recognized through an arrangement plan. In this case, the play activity tracking system 100 may display a normal operation state according to whether the beacon scanner disposed in each pf the play spaces is normally operating or in a failure state through the arrangement plan.

Meanwhile, the play activity tracking system 100 according to the present invention may manage an evaluation index for play activities through a screen for managing a play evaluation index. In this case, a measurement index may include a play preference type (Play pattern 3), a play space type (Play pattern 4), and a design play type (Play pattern 5) among the play patterns shown in FIGS. 9A to 9F.

In this case, when the manager selects a measurement index and inputs a weight on a screen for setting the evaluation index of the play activities, the play activity tracking system 100 reflects the weight to the evaluation index. Upon modification of the evaluation index, the evaluation index is not updated, but the play activity tracking system 100 is executed to raise a version (REV) so as not to affect previous data.

In addition, the play activity tracking system 100 may add or modify the play activity by receiving new information of the play activity. In other words, upon the addition or the modification, items such as an ID, a play zone, a play activity name, a result sheet reflection state, design sensory play availability, a play facility, a play type, a play activity property, and remarks are inputted and executed.

In addition, the play activity tracking system 100 may add or modify the measurement index by receiving new information of the measurement index. In other words, upon the addition or the modification, items such as an ID, a measurement index, a detailed index name, description, and remarks are inputted and executed.

Figure 18:
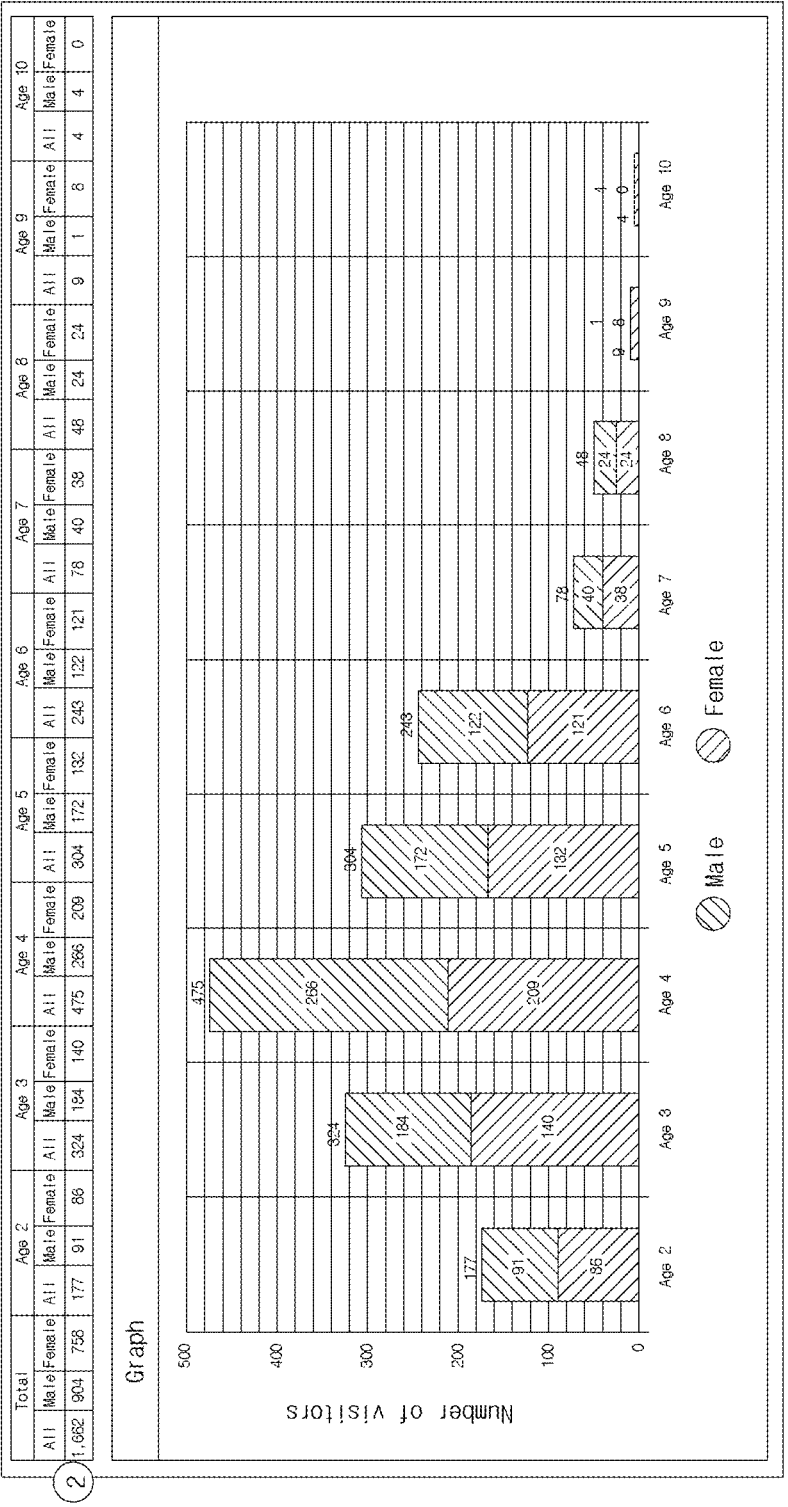
FIG. 18 is a view showing a screen for searching for visitor statistics in the play activity tracking system according to the embodiment of the present invention.

FIG. 18 is a view showing a screen for searching for visitor statistics in the play activity tracking system according to the embodiment of the present invention.

Referring to FIG. 18, the play activity tracking system 100 according to the present invention may provide a function of retrieving data by receiving search conditions such as a period, individual/group/foreigner, and weekday/weekend through a screen for searching visitor statistics (1).

Corresponding results may be displayed by age, gender, and a period, and a graph displays the data based on a gender ratio over age (X-axis) against a visitor (Y-axis)(2).

In addition, the play activity tracking system 100 may provide a function of searching usage time zone statistics. In other words, when the search conditions such as the period, individual/group/foreigner, and weekday/weekend are inputted, corresponding data is retrieved from the play report DB 132 and displayed by age, gender, and a stay time as a search result, and the graph displays the data based on the gender/age (X-axis) against the visitor (Y-axis).

In addition, the play activity tracking system 100 may provide revisitation rate statistics through the search screen. In other words, when the search conditions such as the period, individual/group/foreigner, and weekday/weekend are inputted, corresponding data is retrieved from the play report DB 132 and displayed by age, gender, and a number of revisitation as a search result, and the graph displays the data based on revisitation over gender/age (X-axis) against the visitor (Y-axis).

In addition, the play activity tracking system 100 may provide statistics for each of measurement indexes. In other words, when the search conditions such as the period, a play preference type, and a play activity measurement index are inputted, corresponding data is retrieved and displayed by age, gender, and a usage time as a search result, and the graph displays the data based on the usage time over gender/age (X-axis) against the visitor (Y-axis).

In addition, the play activity tracking system 100 may provide statistics for each of play times. In other words, when the search conditions such as the period and the play facility are inputted, corresponding data is retrieved and displayed by age, gender, and a usage time as a search result, and the graph displays the data based on the usage time over gender/age (X-axis) against the visitor (Y-axis).

In addition, the play activity tracking system 100 may provide peer average statistics. In other words, when the search conditions such as the period and a birth year are inputted, corresponding data is retrieved and displayed by age, gender, a play type, and a usage time as a search result, and the graph displays the data based on the usage time over gender/play type (X-axis) against the visitor (Y-axis).

Meanwhile, the play activity tracking system 100 according to the present invention may provide an integrated maintenance service.

In other words, the play activity tracking system 100 may perform maintenance on beacon devices, and installation and operation, applications, system servers, storage and backup, security equipment, network equipment, application software, other equipment and the like through a unified and integrated maintenance system.

Regular inspection is performed in advance through such an integrated maintenance service, so that failure factors are eliminated, bugs are patched periodically, an environment is checked, fault history management and statistics data is utilized, and performance is improved by special inspection.

In addition, the integrated maintenance service may improve a management and operation system, improve an application software function with modification, addition, and linkage of application software, and execute regular or occasional batch processing.

In a case of the beacon device, the integrated maintenance service may responds to product defects and errors of the beacon device and the beacon scanner (scanner), and may allow the latest firmware upgrade and support. The integrated maintenance service supervises an operation and fault management of the beacon device and a scanner device in installation and operation, and enables service transition installation and support.

In a case of the application, the integrated maintenance service may perform primary system fault reception, emergency management, and quality (SLA) management, and connect a secondary technical support request to an integrated maintenance engineer.

Referring to a procedure of the maintenance, when a fault is discovered and reported, a fault type is analyzed to identify whether the fault corresponds to an overall fault, a partial fault, or an emergency measure, and a maintenance staff is selected with respect to tools and application software.

Change management is executed in addition to installation confirmation during a distribution and installation process, cause analysis, countermeasure establishment, and comprehensive fault reporting are performed in a failure analysis and reporting process, fault statistics are created during a fault statistical management process, and continuous fault prevention measures are executed.

According to the present invention as described above, it is possible to implement the play activity tracking system and the play activity tracking method, in which, when a child walks around each of a plurality of sensory play spaces and performs a play activity excitingly while wearing a beacon device, individual play patterns are monitored and collected through beacon devices worn by children, and the collected data is analyzed in real time according to various indicators (play facility-based interest level/design sense/visit history of participant/age-based comparison index, etc.) to print out a comprehensive play result on a play report result sheet, so that the play report result sheet is used as a reference for well-rounded development of each child.

It will be understood by those skilled in the art to which the present invention pertains that the present invention may be implemented in other specific forms without departing from the spirit or essential characteristics of the present invention, so that the above-described embodiments are illustrative in all aspects and should not be construed as limiting. The scope of the present invention is defined by the appended claims other than the detailed description, and all changes or modifications derived from the meaning and scope of the claims and their equivalents shall be construed as being included within the scope of the present invention.

What is claimed is:

1. A play activity tracking system comprising:
   at least one beacon device worn on a body of a user who walks around a plurality of play spaces and performs a play activity to output a beacon signal at a predetermined time interval;
   at least one beacon scanner disposed at each of the play spaces to transmit entry data by scanning the beacon signal transmitted from the beacon device entering each of the play spaces and to transmit exit data by scanning the beacon signal transmitted from the beacon device exiting from each of the play spaces;
   a data collection and analysis device for receiving the entry data and the exit data for each user from the at least one beacon scanner, generating user-based location tracking data based on the received entry data and the received exit data for each user, and generating a play pattern for each user by analyzing the generated user-based location tracking data; and
   a play report device for generating a comprehensive play report for each user based on the generated play pattern for each user to print out the generated comprehensive play report for each user on a report result sheet, in which the comprehensive play report includes a play facility-based interest level, a design sense level, a visit history, and an age-based comparison index.

2. The play activity tracking system of claim 1, further comprising a play report database (DB) for storing a name and an ID of each of the play spaces, unique identification information of the beacon scanner corresponding to each of the play spaces, an image of a play map on which the play spaces are disposed, the play pattern for each user, and the comprehensive play report for each user.

3. The play activity tracking system of claim 2, wherein the play report DB is configured to:
   store a playground name, a sensory play activity, design sensory play availability, a play type, and a play activity property correspondingly to each of the play spaces; and
   store a user name, a play date, age, gender, a number of visits, a most played activity, a play time in each of playground names, a total play time, a remaining time except for the play activity, an image showing a play time for each of play activities on a map, a time distribution chart for each play according to a past visit history, a graph comparing a play time of the user with a peer average play time over the play type, an occupancy level of a group activity space occupied by the user according to a space size, and a design element graph according to an occupancy rate of each of the play spaces, with respect to the comprehensive play report for each user.

4. The play activity tracking system of claim 1, further comprising:
   a user registration device for receiving and registering information on the user who walks around the play spaces and performs the play activity, and registering a beacon management number of the beacon device worn on the body of the user correspondingly to the information on the user; and a management device for managing an overall usage status for the play spaces, a status for each of play activities, and a user status, managing information on individual users and group users, monitoring the beacon scanner for each of the play spaces to manage a monitoring result as data, managing states of the at least one beacon scanner and the at least one beacon device as data, managing an evaluation index, the play activity, and a measurement index according to the comprehensive play report for each user, and managing visitor statistics, usage time zone statistics, revisitation rate statistics, statistics for each of measurement indexes, statistics for each of play times, and peer average statistics.

5. The play activity tracking system of claim 1, wherein the beacon scanner transmits an unique identifier of the beacon scanner corresponding to the play space which corresponds to a communication area of the beacon scanner, the entry data related to a time at which an entry beacon signal transmitted from the beacon device entering the play space is received, and the exit data related to a time at which an exit beacon signal transmitted from the beacon device exiting from the play space is received to the data collection and analysis device.

6. The play activity tracking system of claim 5, wherein the data collection and analysis device is configured to:
recognize a playground name of the play space corresponding to the unique identifier of the beacon scanner, recognize the time at which the entry beacon signal is received in the play space through the entry data, recognize the time at which the exit beacon signal is received in the play space through the exit data, and calculate a play stay time in the play space by subtracting the time at which the entry beacon signal is received from the time at which the exit beacon signal is received;
generate the user-based location tracking data according to a time sequence by arranging an entry time and an exit time of each of the play spaces for each user according to the time sequence, and correspondingly arranging the playground name of each of the play spaces according to the time sequence; and
analyze the generated user-based location tracking data to generate a table representing a sensory play activity, design sensory play availability, a play type, a play activity property, and a play time which correspond to each of playground names, and the play pattern for each user including a play time map indicating the play time for each of play activities on a map, a distribution chart over the play type in which the play time for each date is expressed on a percentage basis according to the play type, a play time graph comparing the play time with a peer average play time, an occupancy level of a group activity space that indicates a play time occupancy rate for each of group activity spaces, and a design sensory play distribution chart representing the play time over a design element.

7. The play activity tracking system of claim 5, wherein the play report device generates the comprehensive play report for each user based on the generated play pattern for each user to print out the generated comprehensive play report for each user on the report result sheet, in which the comprehensive play report includes a user name, a play date, age, gender, a number of visits, a most played activity, a play time in each of playground names, a total play time, a remaining time except for the play activity, an image showing the play time for each of play activities on a map, a time distribution chart for each play according to a past visit history, a graph comparing the play time of the user with a peer average play time over a play type, an occupancy level of a group activity space occupied by the user according to a space size, and a design sensory play distribution chart representing the play time over a design element.

8. The play activity tracking system of claim 4, wherein the management device provides a web-based management program capable of monitoring and inquiring an operation status of equipment arranged in each of the play spaces in real time, manages a usage status for each user registered through the user registration device, manages a facility of each of the play spaces with data, manages evaluation data according to the comprehensive play report for each of individuals, and manages a statistics status based on the evaluation data.

9. The play activity tracking system of claim 7, wherein the play report device is configured to:
generate the visit history for each user by classifying the user-based location tracking data or data about the comprehensive play report for each user by a date; and
monitor status data of the beacon scanner and status data of the beacon device operated in each of the play spaces in real time.

10. A play activity tracking method of a system including at least one beacon device worn on a body of a user who walks around a plurality of play spaces and performs a play activity, a user registration device for registering the user, at least one beacon scanner disposed at each of the play spaces, a data collection and analysis device for collecting data of the beacon scanner, and a play report device communicating with the data collection and analysis device, the play activity tracking method comprising:
registering, by the user registration device, the user by receiving user information;
matching, by the user registration device, a single beacon device with the received user information;
receiving, by the beacon scanner, a beacon signal from the beacon device;
transmitting, by the beacon scanner, entry data and exit data for each user with respect to the play space based on the received beacon signal;
generating, by the data collection and analysis device, user-based location tracking data based on the received entry data and the received exit data for each user;
generating, by the data collection and analysis device, a play pattern for each user by analyzing the generated user-based location tracking data; and
generating, by the play report device, a comprehensive play report for each user based on the play pattern for each user to print out the generated comprehensive play report for each user on a report result sheet,
wherein the receiving of the beacon signal comprises receiving, by the beacon scanner, an entry beacon signal transmitted when the beacon device enters the play space which corresponds to a communication area of the beacon scanner, receiving the beacon signal from the beacon device in the play space at a predetermined time interval, and receiving an exit beacon signal transmitted when the beacon device exits the play space,
wherein the transmitting of the entry data and the exit data for each user comprises transmitting, by the beacon scanner, an unique identifier of the beacon scanner corresponding to the play space which corresponds to the communication area of the beacon scanner, the entry data related to a time at which the entry beacon signal is received, and the exit data related to a time at which the exit beacon signal is received to the data collection and analysis device, and wherein the generating of the user-based location tracking data comprises:

recognizing, by the data collection and analysis device, a playground name of the play space corresponding to the unique identifier of the beacon scanner, recognizing the time at which the entry beacon signal is received in the play space through the entry data and the time at which the exit beacon signal is received in the play space through the exit data, and calculating a play stay time in the play space by subtracting the time at which the entry beacon signal is received from the time at which the exit beacon signal is received; and generating, by the data collection and analysis device, the user-based location tracking data according to a time sequence by arranging an entry time and an exit time of each of the play spaces for each user according to the time sequence, and correspondingly arranging the playground name of each of the play spaces according to the time sequence.

11. The play activity tracking method of claim 10, wherein the matching of the single beacon device comprises performing the matching by storing a beacon management number of the beacon device matched with the user information in a play report database correspondingly to the user information.

12. The play activity tracking method of claim 10, wherein the generating of the play pattern for each user comprises analyzing, by the data collection and analysis device, the generated user-based location tracking data to generate a table representing a sensory play activity, design sensory play availability, a play type, a play activity property, and a play time which correspond to each of playground names, and the play pattern for each user including a play time map indicating the play time for each of play activities on a map, a distribution chart over the play type in which the play time for each date is expressed on a percentage basis according to the play type, a play time graph comparing the play time with a peer average play time, an occupancy level of a group activity space that indicates a play time occupancy rate for each of group activity spaces, and a design sensory play distribution chart representing the play time over a design element.

13. The play activity tracking method of claim 12, wherein the printing out on the report result sheet comprises generating, by the play report device, the comprehensive play report for each user based on the generated play pattern for each user to print out the generated comprehensive play report for each user on the report result sheet, in which the comprehensive play report includes a user name, a play date, age, gender, a number of visits, a most played activity, the play time in each of the playground names, a total play time, a remaining time except for the play activity, an image showing the play time for each of play activities on a map, a time distribution chart for each play according to a past visit history, a graph comparing the play time of the user with the peer average play time over the play type, the occupancy level of the group activity space occupied by the user according to a space size, and the design sensory play distribution chart representing the play time over the design element.

* * * * *